US012651430B2

(12) United States Patent
Espel-Logan et al.

(10) Patent No.: US 12,651,430 B2
(45) Date of Patent: Jun. 9, 2026

(54) METHODS AND SYSTEMS FOR AUTOMATED MACHINE VISION MONITORING OF VEHICLE SEATS

(71) Applicant: STATE FARM MUTUAL AUTOMOBILE INSURANCE COMPANY, Bloomington, IL (US)

(72) Inventors: Catherine Espel-Logan, Plano, TX (US); Brian Mark Fields, Phoenix, AZ (US); Joshua John Freitas, Peoria, AZ (US); Melissa Collette Miles, Normal, IL (US); Jeanne Koehler, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 183 days.

(21) Appl. No.: 18/416,840

(22) Filed: Jan. 18, 2024

(65) Prior Publication Data

US 2024/0273922 A1 Aug. 15, 2024

Related U.S. Application Data

(60) Provisional application No. 63/541,659, filed on Sep. 29, 2023, provisional application No. 63/530,418, (Continued)

(51) Int. Cl.
*G06V 10/70* (2022.01)
*B60N 2/26* (2006.01)
(Continued)

(52) U.S. Cl.
CPC ............. *G06V 10/70* (2022.01); *B60N 2/266* (2023.08); *B60N 2/268* (2023.08); *B60N 2/272* (2023.08);
(Continued)

(58) Field of Classification Search
None
See application file for complete search history.

(56) References Cited

U.S. PATENT DOCUMENTS

| 9,830,748 B2 | 11/2017 | Rosenbaum |
| 9,990,782 B2 | 6/2018 | Rosenbaum |
| | (Continued) | |

FOREIGN PATENT DOCUMENTS

| EP | 3239686 A1 | 11/2017 |
| EP | 3578433 B1 | 8/2020 |
| | (Continued) | |

*Primary Examiner* — Todd Melton
(74) *Attorney, Agent, or Firm* — MARSHALL, GERSTEIN & BORUN LLP; Randall G. Rueth

(57) ABSTRACT

Methods and systems for monitoring and analyzing vehicle seats, vehicle seat installation, and/or vehicle seat operation. The systems and methods may include (1) obtaining, by one or more processors, image data of a vehicle seat located within a vehicle, wherein the image data may include one or more connecting points of the vehicle seat to the vehicle; (2) inputting, by the one or more processors, the image data into a machine vision model that is trained: (a) using historical image data of vehicle seats within vehicles, (b) to learn a relationship between extracted features of the historical image data and a properness of an installation of a vehicle seat, and/or (c) to output a determination of a properness of an installation of a vehicle seat in response to detecting input image data; and/or (3) presenting, by the one or more processors, an indication of the output of the machine vision model.

20 Claims, 14 Drawing Sheets

Related U.S. Application Data filed on Aug. 2, 2023, provisional application No. 63/524,035, filed on Jun. 29, 2023, provisional application No. 63/488,042, filed on Mar. 2, 2023, provisional application No. 63/445,879, filed on Feb. 15, 2023.

(51) Int. Cl.

| | |
|---|---|
| *B60W 30/08* | (2012.01) |
| *G06F 21/62* | (2013.01) |
| *G06Q 30/0601* | (2023.01) |
| *G06V 10/764* | (2022.01) |
| *G06V 20/40* | (2022.01) |
| *G06V 20/59* | (2022.01) |

(52) U.S. Cl.
CPC ......... *B60W 30/08* (2013.01); *G06F 21/6218* (2013.01); *G06Q 30/0643* (2013.01); *G06V 10/764* (2022.01); *G06V 20/41* (2022.01); *G06V 20/59* (2022.01); *B60W 2756/10* (2020.02); *G06T 2207/30268* (2013.01)

(56) References Cited

U.S. PATENT DOCUMENTS

| | | | | |
|---|---|---|---|---|
| 10,269,190 | B2 | 4/2019 | Rosenbaum | |
| 10,467,824 | B2 | 11/2019 | Rosenbaum | |
| 11,227,452 | B2 | 1/2022 | Rosenbaum | |
| 11,273,779 | B2 * | 3/2022 | Murata | G06V 20/59 |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 12,157,485 | B2 * | 12/2024 | Hawley | G06V 20/59 |
| 2020/0410790 | A1 * | 12/2020 | Thompson | G01N 21/8851 |
| 2022/0092893 | A1 | 3/2022 | Rosenbaum | |
| 2022/0340148 | A1 | 10/2022 | Rosenbaum | |
| 2023/0060300 | A1 | 3/2023 | Rosenbaum | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

300

Figure 6:
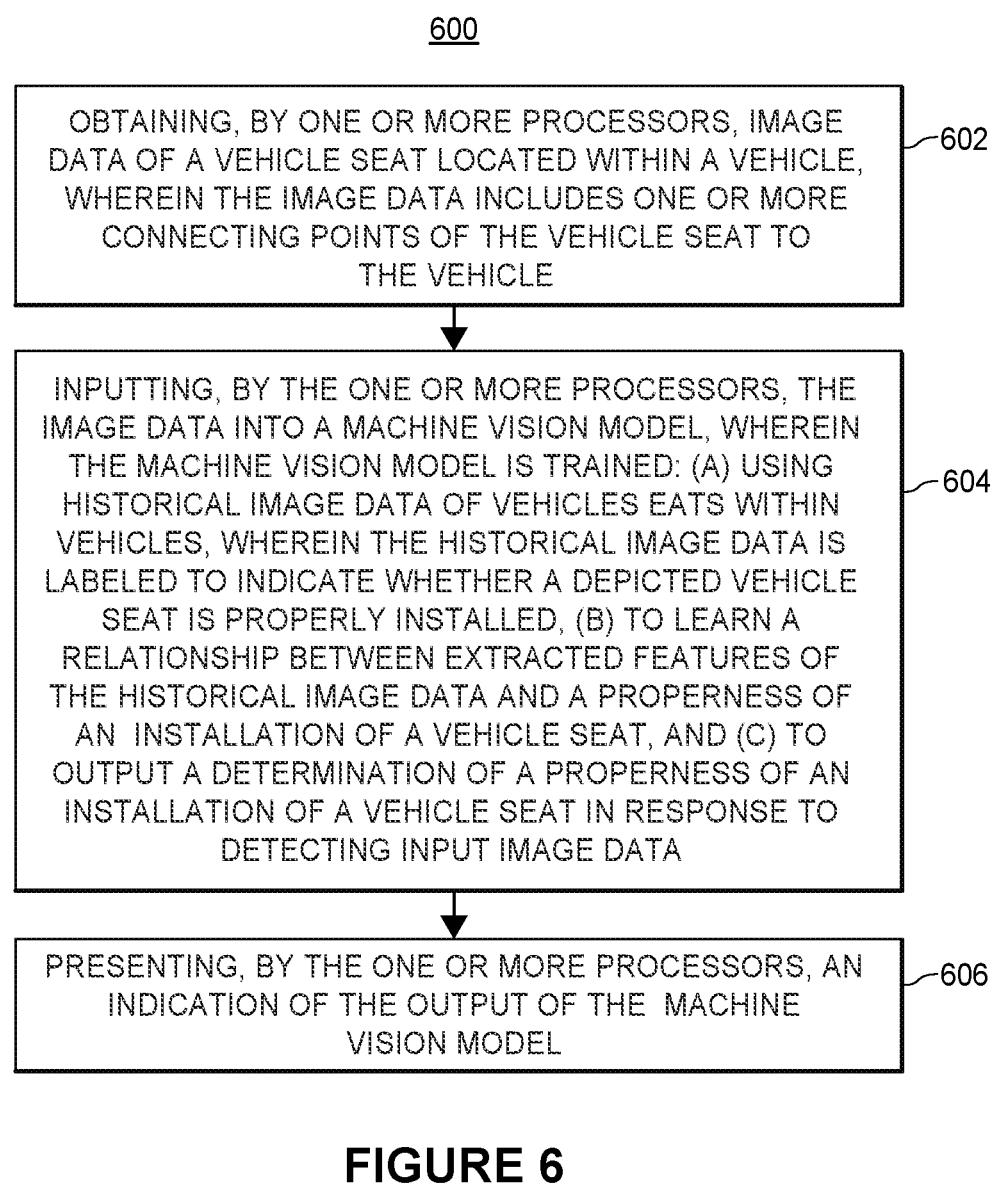

600

OBTAINING, BY ONE OR MORE PROCESSORS, IMAGE DATA OF A VEHICLE SEAT LOCATED WITHIN A VEHICLE, WHEREIN THE IMAGE DATA INCLUDES ONE OR MORE CONNECTING POINTS OF THE VEHICLE SEAT TO THE VEHICLE ⌐602

INPUTTING, BY THE ONE OR MORE PROCESSORS, THE IMAGE DATA INTO A MACHINE VISION MODEL, WHEREIN THE MACHINE VISION MODEL IS TRAINED: (A) USING HISTORICAL IMAGE DATA OF VEHICLES EATS WITHIN VEHICLES, WHEREIN THE HISTORICAL IMAGE DATA IS LABELED TO INDICATE WHETHER A DEPICTED VEHICLE SEAT IS PROPERLY INSTALLED, (B) TO LEARN A RELATIONSHIP BETWEEN EXTRACTED FEATURES OF THE HISTORICAL IMAGE DATA AND A PROPERNESS OF AN INSTALLATION OF A VEHICLE SEAT, AND (C) TO OUTPUT A DETERMINATION OF A PROPERNESS OF AN INSTALLATION OF A VEHICLE SEAT IN RESPONSE TO DETECTING INPUT IMAGE DATA ⌐604

PRESENTING, BY THE ONE OR MORE PROCESSORS, AN INDICATION OF THE OUTPUT OF THE MACHINE VISION MODEL ⌐606

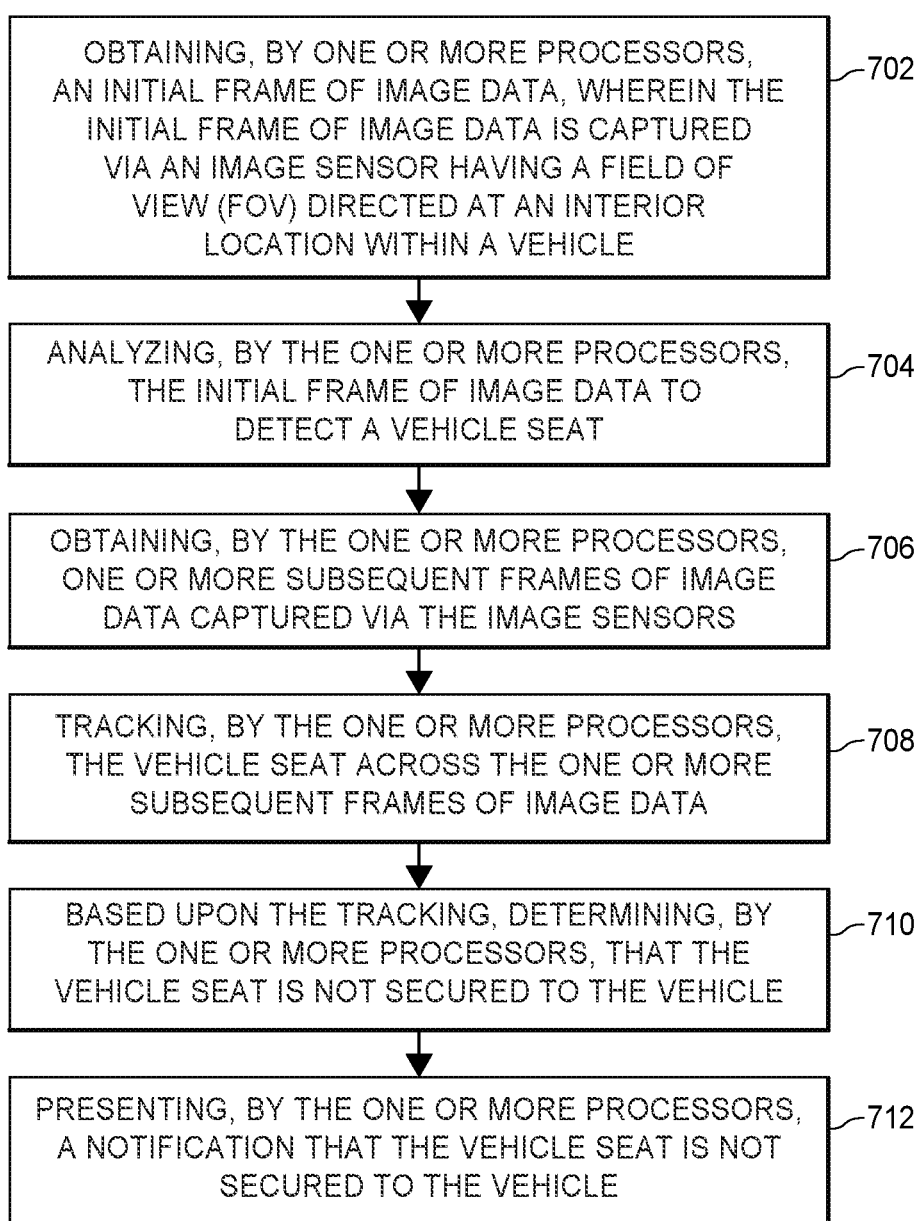

OBTAINING, BY ONE OR MORE PROCESSORS, AN INITIAL FRAME OF IMAGE DATA, WHEREIN THE INITIAL FRAME OF IMAGE DATA IS CAPTURED VIA AN IMAGE SENSOR HAVING A FIELD OF VIEW (FOV) DIRECTED AT AN INTERIOR LOCATION WITHIN A VEHICLE ⟋702

ANALYZING, BY THE ONE OR MORE PROCESSORS, THE INITIAL FRAME OF IMAGE DATA TO DETECT A VEHICLE SEAT ⟋704

OBTAINING, BY THE ONE OR MORE PROCESSORS, ONE OR MORE SUBSEQUENT FRAMES OF IMAGE DATA CAPTURED VIA THE IMAGE SENSORS ⟋706

TRACKING, BY THE ONE OR MORE PROCESSORS, THE VEHICLE SEAT ACROSS THE ONE OR MORE SUBSEQUENT FRAMES OF IMAGE DATA ⟋708

BASED UPON THE TRACKING, DETERMINING, BY THE ONE OR MORE PROCESSORS, THAT THE VEHICLE SEAT IS NOT SECURED TO THE VEHICLE ⟋710

PRESENTING, BY THE ONE OR MORE PROCESSORS, A NOTIFICATION THAT THE VEHICLE SEAT IS NOT SECURED TO THE VEHICLE ⟋712

FIG. 7

METHODS AND SYSTEMS FOR AUTOMATED MACHINE VISION MONITORING OF VEHICLE SEATS

CROSS REFERENCE TO RELATED APPLICATIONS

The present application claims the benefit of U.S. Provisional Patent Application No. 63/541,659, entitled "Methods and Systems of Using Augmented Reality for Visualizing the Proper Fastening of a Vehicle Seat," filed on Sep. 29, 2023, U.S. Provisional Patent Application No. 63/530,418, entitled "Methods and Systems for Generating, Maintaining, and Using Information Related to Vehicle Seats Stored on a Blockchain," filed on Aug. 2, 2023, U.S. Provisional Patent Application No. 63/524,035, entitled "Methods and Systems of Using Augmented Reality for Visualizing the Proper Fastening of a Vehicle Seat," filed on Jun. 29, 2023, U.S. Provisional Patent Application No. 63/488,042, entitled "Methods and Systems for Automated Vehicle Seat Replacement," filed on Mar. 2, 2023, U.S. Provisional Patent Application No. 63/445,879, entitled "Methods and Systems for Simulating a Vehicle Seat in a Vehicle," filed on Feb. 15, 2023, each of which are hereby expressly incorporated by reference herein in their entirety.

TECHNICAL FIELD

The present disclosure generally relates to machine vision algorithms, techniques, platforms, methods, and systems for monitoring and analyzing vehicle seats, vehicle seat installation, and/or vehicle seat operation.

BACKGROUND

Properly installing vehicle seats helps ensure safe travel of toddlers, children, and animals. Vehicle accidents and collisions that occur while a vehicle seat is improperly installed may result in serious injury or death. Despite these dangers, parents, guardians, and care givers continue to improperly install vehicle seats. Indeed, in 2015, the National Highway Traffic Safety Administration (NHTSA) estimated that as many as 59% of all vehicle seats on the road were not correctly installed.

One problem with properly installing vehicle seats may be the difficulty of installation. Modern vehicle seats often may come with a variety of straps, harnesses, and adjustment mechanisms as well as connecting points between the seat and the vehicle, all of which may make it difficult to discern how the seat should be installed. This may be exacerbated by the fact that there is no standardization between vehicle seats and vehicle interiors. As such, parents and guardians may be unable to rely on prior knowledge when replacing a vehicle seat with a different model. Additionally, when parents and guardians are operating a vehicle with a properly installed vehicle seat, it may be difficult to detect when the vehicle seat has become dislodged or otherwise altered such that the vehicle seat is no longer properly installed.

The conventional techniques for installing and monitoring vehicle seats may include additional encumbrances, ineffi- ciencies, drawbacks, and/or challenges.

SUMMARY

In some embodiments, a computer-implemented method for monitoring the installation of a vehicle seat may be provided. The method may be implemented via one or more local or remote processors, transceivers, sensors, servers, memory units, mobile devices, wearables, smart devices, smart glasses, augmented reality (AR) glasses, virtual reality (VR) headsets, extended or mixed reality glasses or head-sets, voice bots, chat bots, ChatGPT bots, ChatGPT-based bots, and/or other electronic or electrical components, which may be in wired or wireless communication with one another. For example, in one instance, the method may include: (1) obtaining, by one or more processors, image data of a vehicle seat located within a vehicle, wherein the image data may include one or more connecting points of the vehicle seat to the vehicle; (2) inputting, by the one or more processors, the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the his-torical image data and a properness of an installation of a vehicle seat, and/or (c) to output a determination of a properness of an installation of a vehicle seat in response to detecting input image data; and/or (3) presenting, by the one or more processors, an indication of the output of the machine vision model. The method may include additional, less, or alternate actions, including those discussed else-where herein.

In other embodiments, a computer system for monitoring the installation of a vehicle seat may be provided. The computer system may include, or be configured to work with, one or more local or remote processors, transceivers, sensors, servers, memory units, mobile devices, wearables, smart devices, smart glasses, augmented reality (AR) glasses, virtual reality (VR) headsets, extended or mixed reality glasses or headsets, voice bots, chat bots, ChatGPT bots, ChatGPT-based bots, and/or other electronic or elec-trical components, which may be in wired or wireless communication with one another. For example, in one instance, the computing system may include one or more processors and associated transceivers, and a non-transitory program memory coupled to the one or more processors and storing executable instructions that, when executed by the one or more processors, cause the computer system to: (1) obtain image data of a vehicle seat located within a vehicle, wherein the image data may include one or more connecting points of the vehicle seat to the vehicle; (2) input the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a prop-erness of an installation of a vehicle seat, and/or (c) to output a determination of a properness of an installation of a vehicle seat in response to detecting input image data; and/or (3) present an indication of the output of the machine vision model. The computer system may be configured to include additional, less, or alternate functionality, including that discussed elsewhere herein.

In yet other embodiments, a tangible, a non-transitory computer-readable medium for monitoring the installation of a vehicle seat may be provided. The executable instruc-tions, when executed by one or more processors of a computer system, cause the computer system to: (1) obtain image data of a vehicle seat located within a vehicle, wherein the image data includes one or more connecting points of the vehicle seat to the vehicle; (2) input the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a properness of an installation of a vehicle seat, and/or (c) to output a determination of a properness of an installation of a vehicle seat in response to detecting input image data; and/or (3) present an indication of the output of the machine vision model. The instructions may direct additional, less, or alternate functionality, including that discussed elsewhere herein.

In some embodiments, a computer-implemented method for monitoring the operation of an installed vehicle seat may be provided. The method may be implemented via one or more local or remote processors, transceivers, sensors, servers, memory units, mobile devices, wearables, smart devices, smart glasses, augmented reality (AR) glasses, virtual reality (VR) headsets, extended or mixed reality glasses or headsets, voice bots, chat bots, ChatGPT bots, ChatGPT-based bot, and/or other electronic or electrical components, which may be in wired or wireless communication with one another. For example, in one instance, the method may include: (1) obtaining, by one or more processors, an initial frame of image data, wherein the first set of image data may be captured via an image sensor having a field of view (FOV) directed at an interior location within a vehicle; (2) analyzing, by the one or more processors, the initial frame of image data to detect a vehicle seat; (3) obtaining, by the one or more processors, one or more subsequent frames of image data that may be captured via the image sensors; (4) tracking, by the one or more processors, the vehicle seat across the one or more subsequent frames of image data; (5) based upon the tracking, determining, by the one or more processors, that the vehicle seat is not secured to the vehicle; and/or (6) presenting, by the one or more processors, a notification that the vehicle seat is not secured to the vehicle. The method may include additional, less, or alternate actions, including those discussed elsewhere herein.

In other embodiments, a computer system for monitoring the operation of an installed vehicle seat may be provided. The computer system may include, or be configured to work with, one or more local or remote processors, transceivers, sensors, servers, memory units, mobile devices, wearables, smart devices, smart glasses, augmented reality (AR) glasses, virtual reality (VR) headsets, extended or mixed reality glasses or headsets, voice bots, chat bots, ChatGPT bots, ChatGPT-based bots, and/or other electronic or electrical components, which may be in wired or wireless communication with one another. For example, in one instance, the computing system may include one or more processors and associated transceivers, and a non-transitory program memory coupled to the one or more processors and storing executable instructions that, when executed by the one or more processors, cause the computer system to: (1) obtain an initial frame of image data, wherein the first set of image data may be captured via an image sensor that may have a field of view (FOV) directed at an interior location within a vehicle; (2) analyze the initial frame of image data to detect a vehicle seat; (3) obtain one or more subsequent frames of image data that may be captured via the image sensors; (4) track the vehicle seat across the one or more subsequent frames of image data; (5) based upon the tracking, determine that the vehicle seat is not secured to the vehicle; and/or (6) present a notification that the vehicle seat is not secured to the vehicle. The computer system may be configured to include additional, less, or alternate functionality, including that discussed elsewhere herein.

In yet other embodiments, a tangible, a non-transitory computer-readable medium for monitoring the operation of an installed vehicle seat may be provided. The executable instructions, when executed by one or more processors of a computer system, cause the computer system to: (1) obtain an initial frame of image data, wherein the first set of image data may be captured via an image sensor that may have a field of view (FOV) directed at an interior location within a vehicle; (2) analyze the initial frame of image data to detect a vehicle seat; (3) obtain one or more subsequent frames of image data captured via the image sensors; (4) track the vehicle seat across the one or more subsequent frames of image data; (5) based upon the tracking, determine that the vehicle seat is not secured to the vehicle; and/or (6) present a notification that the vehicle seat is not secured to the vehicle. The instructions may direct additional, less, or alternate functionality, including that discussed elsewhere herein.

The present disclosure may include improvements in computer functionality or in improvements to other technologies at least because the disclosure herein discloses systems and methods for monitoring the installation and/or operation of vehicle seats. The systems and methods herein may train machine learning and/or machine vision models using input data vectors (e.g., one or more sets of image data of previously installed vehicle seats and corresponding designations of whether the vehicle seats were properly installed and/or the like) to generate confidence values regarding the likelihood of correct installation of vehicle seats based upon the relationship between the image data and corresponding designations. For example, when deployed within the underlying system, the machine learning and/or machine vision models allow the systems and methods of the present disclosure to use fewer computing resources than related, conventional practices, at least because such conventional practices would require manual data entry, data storage, and/or implementation, all of which result in greater memory usage and processor utilization.

Additional improvements may also include practical applications for the improvement of technology. For example, the system, utilizing the machine learning and/or machine vision models, may be able to track and determine whether a vehicle seat is secure while an operator is driving a vehicle, which would make trips far safer (both for the passenger in the vehicle seat and the operator who would be able to maintain focus on the road). In addition, the present disclosure solves the above-described problem related to the proliferation of improperly installed vehicle seats, to further improve the safety of vehicle passengers.

Similarly, the present disclosure describes improvements in the functioning of the computer or "any other technology or technical field" because the data generated (e.g., the confidence values) described herein allows the underlying computer system to utilize less processing and memory resources compared to prior art systems and methods. This is at least because the machine learning and/or machine vision models can generate and/or determine data regarding the likelihood of correct vehicle seat installation without the need for various tests and/or empirical computer simulation across a wide range of tests using multiple compute cycles and data. Therefore, use of the machine learning and/or machine vision models results in fewer compute cycles, or otherwise iterations, that has less of an impact on the underlying computing device compared to previous prior art systems and methods.

Advantages will become more apparent to those of ordinary skill in the art from the following description of the preferred embodiments, which have been shown and described by way of illustration. As will be realized, the present embodiments may be capable of other and different embodiments, and details are capable of modification in various respects. Accordingly, the drawings and description are to be regarded as illustrative in nature and not as restrictive.

BRIEF DESCRIPTION OF THE DRAWINGS

The figures described below depict various embodiments of the systems and methods disclosed herein. It should be understood that the figures depict illustrative embodiments of the disclosed systems and methods, and that the figures are intended to be exemplary in nature. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

6

Figure 5A:
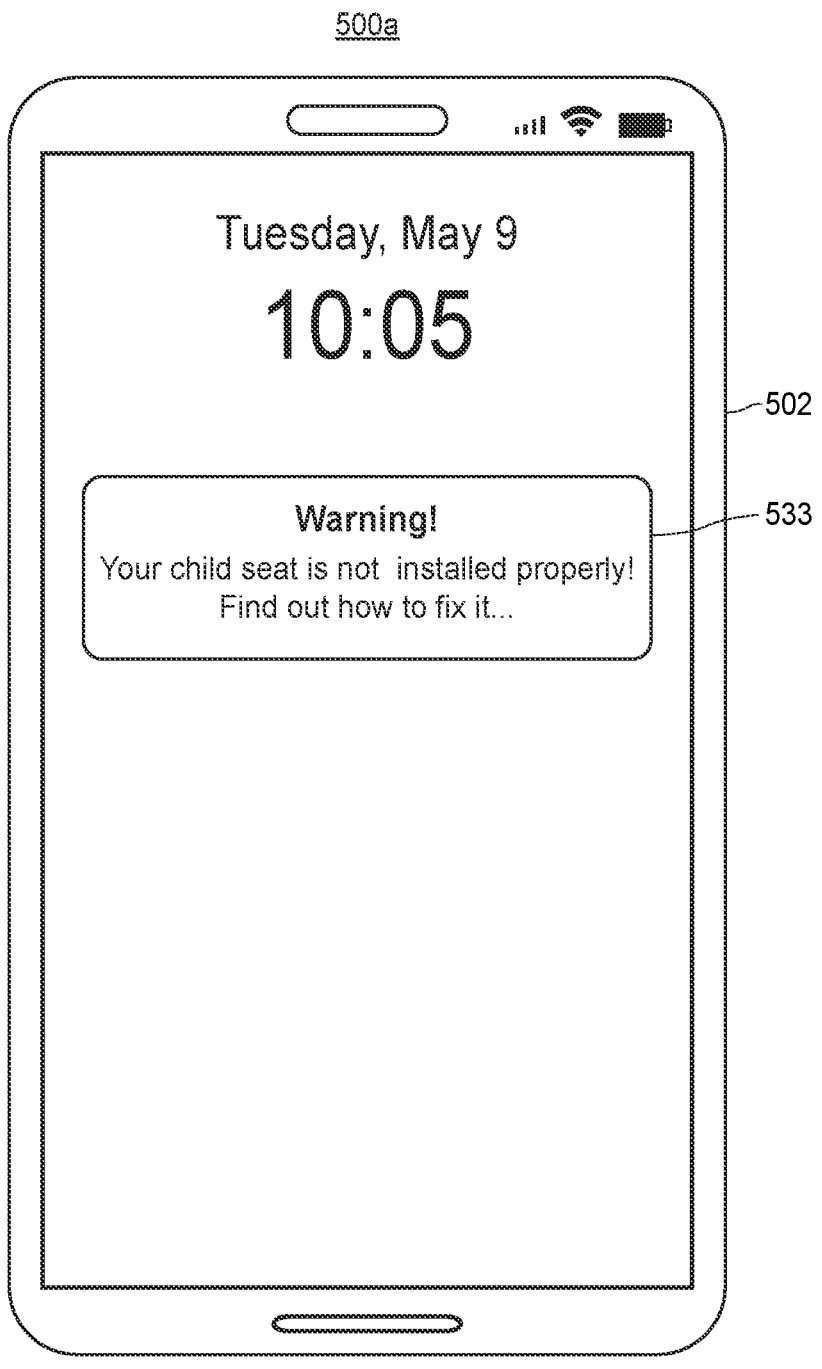
FIG. 5A depicts an exemplary output of the machine learning and/or machine vision system implementing the methods and systems for automated monitoring of vehicle seat installation.
Figure 5B:
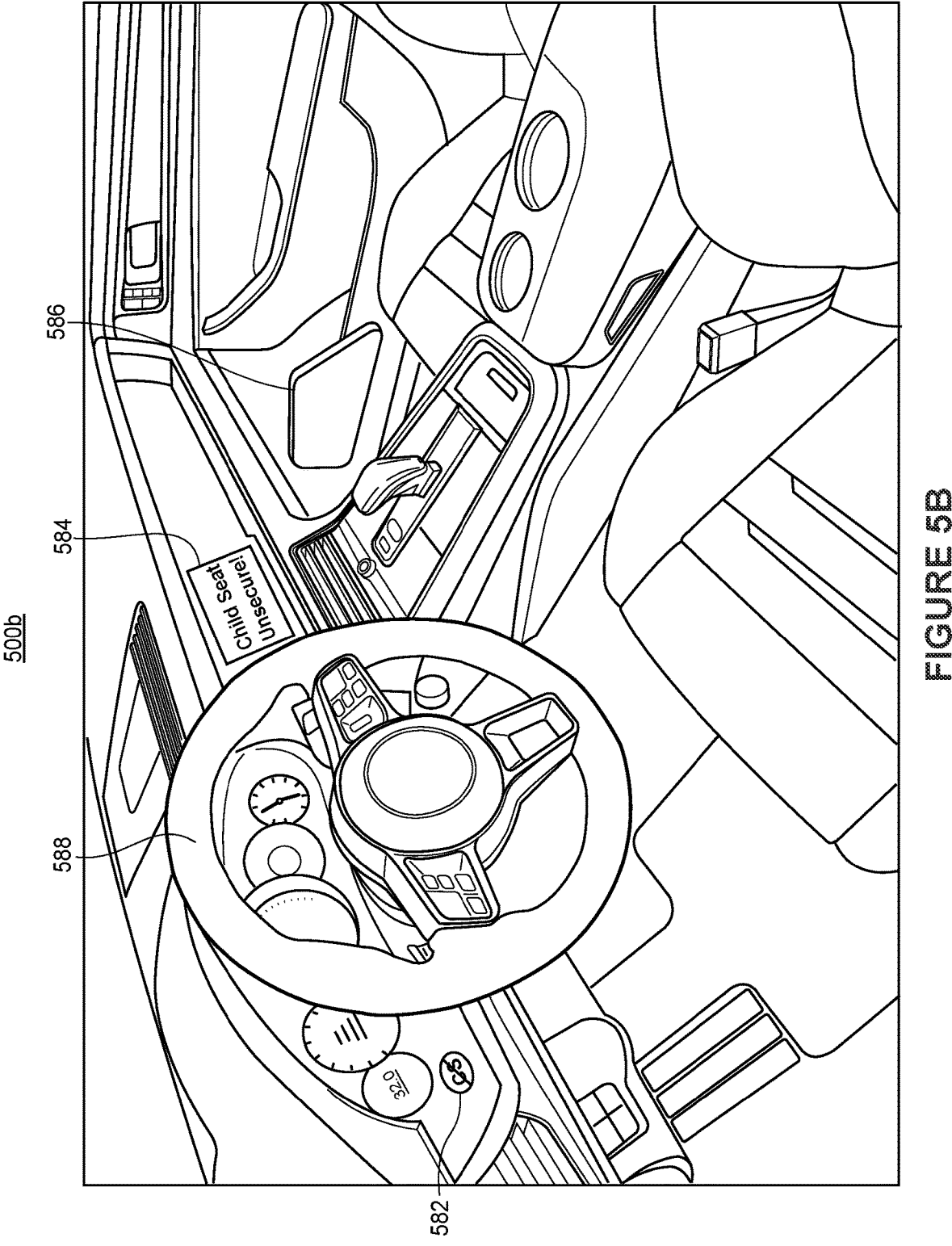

FIG. 5B depicts an exemplary output of the machine learning and/or machine vision system implementing the methods and systems for automated monitoring of vehicle seat operation;

FIG. 6 depicts an exemplary computer-implemented method for automated monitoring of vehicle seat installation; and FIG. 7 depicts an exemplary computer-implemented method for automated monitoring of vehicle seat operation.

The figures depict the present embodiments for purposes of illustration only. One skilled in the art will readily recognize from the following discussion that alternate embodiments of the structures and methods illustrated herein may be employed without departing from the principles of the invention described herein.

DETAILED DESCRIPTION

To assist operators of vehicles with the installation of vehicle seats, systems and methods for monitoring and/or analyzing the installation and/or operation of vehicle seats in vehicles are presented.

In a first embodiment, a computer system may determine whether a vehicle seat has been properly installed in a vehicle. After installing the vehicle seat to a vehicle, a user may capture image data of the vehicle seat using a user device. The user device may transmit the image data to the computer system for processing. In some embodiments, image data includes images captured from one or more fields of view (FOV). Upon receiving the image data, the computer system may analyze the image data to: (i) recognize and/or identify the vehicle seat and/or (ii) determine whether the vehicle seat has been properly installed to the vehicle. In some embodiments, the computer system may also analyze the image data to determine an error in the installation of the vehicle seat and present the operator with specific instructions on how to rectify the error. The computer system may apply machine learning and/or machine vision techniques during analysis. In some embodiments, the computer system may present the image data to a reviewer. The reviewer may evaluate the accuracy of the computer system's determinations of whether the vehicle seat is properly installed to the vehicle. The computer system may be re-trained using the reviewer's determination as training data.

In a second embodiment, a computer system may determine whether a vehicle seat is properly secured to a vehicle seat during operation of the vehicle. One or more image sensors may capture initial image data of a vehicle seat within the vehicle. A computer system (e.g., a remote application server, a computer coupled to the vehicle, etc.) may analyze the image data to: (i) recognize and/or identify the vehicle seat and/or (ii) determine whether the vehicle seat is properly installed and/or properly secured to the vehicle. In some embodiments, the computer system may determine that the vehicle seat is not securely fastened to the vehicle seat based upon a threshold displacement of the vehicle seat across one or more images of the image data. "Image frames" or "frames" is herein defined to mean a set of one or more images of image data captured at approximately the same point in time. Additionally, it should be noted that an "initial frame" need not be the first image frame captured by the one or more sensors. Additionally or alternatively, in some embodiments, the computer system may determine that the vehicle seat is not securely fastened to the vehicle seat based upon a machine learning and/or machine vision model. In these embodiments, the machine learning and/or machine vision model may utilize a single image as an input. Upon making the determination, the computer system may alert the operator of the vehicle that the vehicle seat is not securely fastened to the vehicle (e.g., via an auditory alarm, a visual alarm, a haptic alarm, etc.).

It should be noted that the term "vehicle seats," as it is generally used herein, may refer to any vehicle seat that are placed into a vehicle to accommodate and/or otherwise protect toddlers and other small children. Accordingly, the term "vehicle seats" may refer to "toddler seats," "child seats," "safety seats," "booster seats," etc. In one embodiment, the vehicle seat may be a toddler's seat (e.g., a rear-facing, toddler's vehicle seat) designed to safely accommodate toddlers under a specific age, height, and/or weight (e.g., vehicle seats for toddlers aged two and under). In another embodiment, the vehicle seat may be a child seat (e.g., a forward-facing, children's vehicle seat) designed to safely accommodate children between specific age, height, and/or weight ranges (e.g., vehicle seats for children between 50 lbs. and 100 lbs.). In yet another embodiment, the vehicle seat may be a safety seat (e.g., an adult's booster seat) to safely accommodate individuals at any age but between specific height, and/or weight ranges (e.g., vehicle seats for adults between 3 ft. tall and 5 ft. tall).

Exemplary Machine Learning Techniques

The present embodiments may involve, inter alia, the use of cognitive computing, predictive modeling, machine learning, and/or other modeling techniques and/or algorithms. In particular, image data may be input into one or more machine learning programs described herein that are trained and/or validated to monitor the installation of a vehicle seat and/or monitor the operation of a vehicle seat.

In certain embodiments, the systems, methods, and/or techniques discussed herein may use heuristic engines, algorithms, machine learning, cognitive learning, deep learning, combined learning, predictive modeling, and/or pattern recognition techniques. For instance, a processor and/or a processing element may be trained using supervised or unsupervised machine learning, and the machine learning program may employ a neural network, which may be a convolutional neural network (CNN), a fully convolutional neural network (FCN), a deep learning neural network, and/or a combined learning module or program that learns in two or more fields or areas of interest. Machine learning may involve identifying and/or recognizing patterns in existing data in order to facilitate making predictions, estimates, and/or recommendations for subsequent data. Models may be created based upon example inputs in order to make valid and reliable outputs for novel inputs.

Additionally or alternatively, the machine learning programs may be trained and/or validated using labeled training data sets, such as sets of image data of previously installed vehicle seats and corresponding labels of whether the vehicle seats were properly installed, etc. The machine learning programs may utilize deep learning algorithms that may be primarily focused on pattern recognition and may be trained after processing multiple examples.

In supervised machine learning, a processing element identifies patterns in existing data to make predictions about subsequently received data. Specifically, the ML module is "trained" using training data, which includes example inputs and associated example outputs. Based upon the training data, the processing element may generate a predictive function which maps outputs to inputs and may utilize the predictive function to generate outputs based upon data inputs. The exemplary inputs and exemplary outputs of the training data may include any of the data inputs or outputs described herein. In the exemplary embodiment, the processing element may be trained by providing it with a large sample of data with known characteristics or features. In this way, when subsequent novel inputs are provided the processing element may, based upon the discovered association, accurately predict the correct output In unsupervised machine learning, the processing element finds meaningful relationships in unorganized data. Unlike supervised learning, unsupervised learning does not involve user-initiated training based upon example inputs with associated outputs. Rather, in unsupervised learning, the processing element may organize unlabeled data according to a relationship determined by at least one machine learning method/algorithm employed by the processing element. Unorganized data may include any combination of data inputs and/or outputs as described herein.

In semi-supervised machine learning, the processing element may use thousands of individual supervised machine learning iterations to generate a structure across the multiple inputs and outputs. In this way, the processing element may be able to find meaningful relationships in the data, similar to unsupervised learning, while leveraging known characteristics or features in the data to make predictions.

In reinforcement learning, the processing element may optimize outputs based upon feedback from a reward signal. Specifically, the processing element may receive a user-defined reward signal definition, receive a data input, utilize a decision-making model to generate an output based upon the data input, receive a reward signal based upon the reward signal definition and the output, and alter the decision-making model so as to receive a stronger reward signal for subsequently generated outputs.

In some embodiments, the machine learning model may include a neural network, such as a convolutional neural network (CNN) model and/or a fully convolutional neural network (FCN). For example, the CNN may be trained on a set of labeled historical data to produce a binary classification decision as to whether or not a vehicle seat has been properly installed in a vehicle. Accordingly, the training data may include a first set of images of vehicle seats that are labeled as being properly installed in a vehicle and a second set of images of vehicle seats that are labeled as being improperly installed in a vehicle. In some embodiments, the sets of images may include subsets of associated images depicting the same vehicle seat installation from a plurality of angles and/or orientations.

Generally, the second set of images should include a sufficient number of images of improperly installed vehicle seats for the machine learning model to identify characteristics that can be accurately associated with improperly installed vehicle seats. For example, vehicle seats that are not properly installed in vehicles can be jostled and/or otherwise moved relative to fixed points (such as the interior of the vehicle). Therefore, the second set of images may include several images of vehicle seats wherein the vehicle seat is purposefully not properly installed to vehicle and/or otherwise positioned in an improper position. As another example, vehicle seats that are not properly installed in vehicles may not be properly tethered to the vehicle via connecting points, fasteners, straps, anchors, etc. Thus, the second set of images may include several images of vehicle seat connecting points that are not securely installed, fastened, or otherwise improperly secured to the vehicle.

According to certain aspects, the threshold number of images may be chosen to avoid biasing the trained machine learning model. In some embodiments, this means that there are roughly the same number of images that represent each characteristic that renders the vehicle seat as improperly installed and/or secured to the vehicle. If a particular image is associated with a vehicle seat that exhibits multiple characteristics that render the vehicle seat as improperly installed and/or secured, the image may count towards both thresholds.

By training a machine learning model in the disclosed manner, the trained machine learning model may be able to detect any characteristic that renders a vehicle seat as improperly installed and/or secured to vehicles. As such, the need to train component machine learning models to detect individual defects may be avoided. This may result in a faster evaluation of vehicle seats and/or reduce the amount of time needed to automate the evaluation of vehicle seats. In some instances, the evaluation of vehicle seats may be real time or near real-time, allowing for accurate evaluations during mid-transit of the vehicle.

In some embodiments, generative artificial intelligence (AI) models (also referred to as generative machine learning (ML) models) and/or other AI/ML models discussed herein may be implemented via one or more voice bots and/or chatbots that may be configured to utilize artificial intelligence and/or machine learning techniques. For instance, the voice and/or chatbot may be a ChatGPT chatbot and/or a ChatGPT-based bot. The voice and/or chatbot may employ supervised, unsupervised, and/or semi-supervised machine learning techniques, which may be followed by, and/or used in conjunction with, reinforced and/or reinforcement learning techniques. The voice and/or chatbot may employ the techniques utilized for ChatGPT. The voice bot, chatbot, ChatGPT bot, ChatGPT-based bot, and/or other such generative model may generate audible or verbal output, text or textual output, visual or graphical output, output for use with speakers and/or display screens, and/or other types of output for user and/or other computer or bot consumption.

Noted above, in some embodiments, a chatbot or other computing device may be configured to implement machine learning, such that server computing device "learns" to analyze, organize, and/or process data without being explicitly programmed. Machine learning and/or artificial intelligence may be implemented through machine learning methods and algorithms. In one exemplary embodiment, a machine learning module may be configured to implement the ML methods and algorithms.

As used herein, a voice bot, chatbot, ChatGPT bot, ChatGPT-based bot, and/or other such generative model (referred to broadly as "chatbot" herein) may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network (GAN) techniques, such as the machine learning techniques, algorithms, and systems described in more detail below.

The chatbot may receive inputs from a user via text input, spoken input, gesture input, etc. The chatbot may then use AI and/or ML techniques as described herein to process and analyze the input before determining an output and displaying the output to the user. Depending on the embodiment, the output may be in a same or different form than the input (e.g., spoken, text, gestures, etc.), may include images, and/or may otherwise communicate the output to the user in an overarching dialogue format.

In some embodiments, at least one of a plurality of ML methods and algorithms may be applied to implement and/or train the chatbot, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the chatbot ML module employs supervised learning, which involves identifying patterns in existing data to make predictions about subsequently received data. Specifically, the chatbot ML module may be "trained" using training data, which includes example inputs and associated example outputs. Based upon the training data, the chatbot ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, the chatbot ML module may employ unsupervised learning, which involves finding meaningful relationships in unorganized data. Unlike supervised learning, unsupervised learning does not involve user-initiated training based upon example inputs with associated outputs. Rather, in unsupervised learning, the chatbot ML module may organize unlabeled data according to a relationship determined by at least one ML method/algorithm employed by the chatbot ML module. Unorganized data may include any combination of data inputs and/or ML outputs as described above.

In yet another embodiment, the chatbot ML module may employ semi-supervised learning, which involves using thousands of individual supervised machine learning iterations to generate a structure across the multiple inputs and outputs. In this way, the chatbot ML module may be able to find meaningful relationships in the data, similar to unsupervised learning, while leveraging known characteristics or features in the data to make predictions via a ML output.

In yet another embodiment, the chatbot ML module may employ reinforcement learning, which involves optimizing outputs based upon feedback from a reward signal. Specifically, the chatbot ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, the chatbot ML module may be used in conjunction with the machine vision, image recognition, object identification, and/or other image processing techniques discussed below. Additionally or alternatively, in some embodiments, the chatbot ML module may be configured and/or trained to implement one or more aspects of the machine vision, image recognition, objection identification, and/or other image processing techniques discussed below.

Exemplary Machine Vision, Image Recognition, and Object Identification Techniques The present embodiments may involve, inter alia, the use of machine vision, image recognition, object identification, and/or other image processing techniques and/or algorithms. In particular, image data may be input into one or more machine vision programs described herein that are able to recognize, track, and/or identify vehicle seats and/or specific features of vehicle seats (e.g., the connecting and/or fastening points between the vehicle seats and the vehicle) in and across the image data. Additionally, such machine vision programs may also be able to analyze the image data itself to determine the quality of the image data, select one or more images from a plurality of image data, and/or the like.

In certain embodiments, the systems, methods, and/or techniques discussed herein may process and/or analyze the image data via image classification, image recognition, and/or image identification techniques (e.g., query by image content (QBIC), optical character recognition (OCR), pattern and/or shape recognition, histogram of oriented gradients (HOG) and/or other object detection methods), two dimensional image scanning, three dimensional image scanning, and/or the like. Any of the machine learning techniques discussed herein may also be used in conjunction with any machine vision techniques described herein.

In some embodiments, the systems may utilize focus measure operators and/or accompanying algorithms (e.g., gradient-based operators, Laplacian-based operators, wavelet-based operators, statistics-based operators, discrete cosine transform based operators, and/or the like) to determine the focus of the image data. Such operators and/or algorithms may be applied to the image data as a whole or to a portion of the image data. The resulting focus may be a representation of the quality of the image data. If the focus (and, thus, the quality) of the image data falls below a threshold value, subsequent image data may be captured.

In embodiments where the image data includes one or more frames of image data (e.g., when the image data captured via burst imaging techniques, video techniques, etc.), a single frame from the one or more frames may be selected from the image data for processing. In some embodiments, the single frame is selected based upon the quality of the image data in the frames. In these embodiments, the frame with the highest relative quality among the captured frames may be selected.

Exemplary Computing Environment

Figure 1:
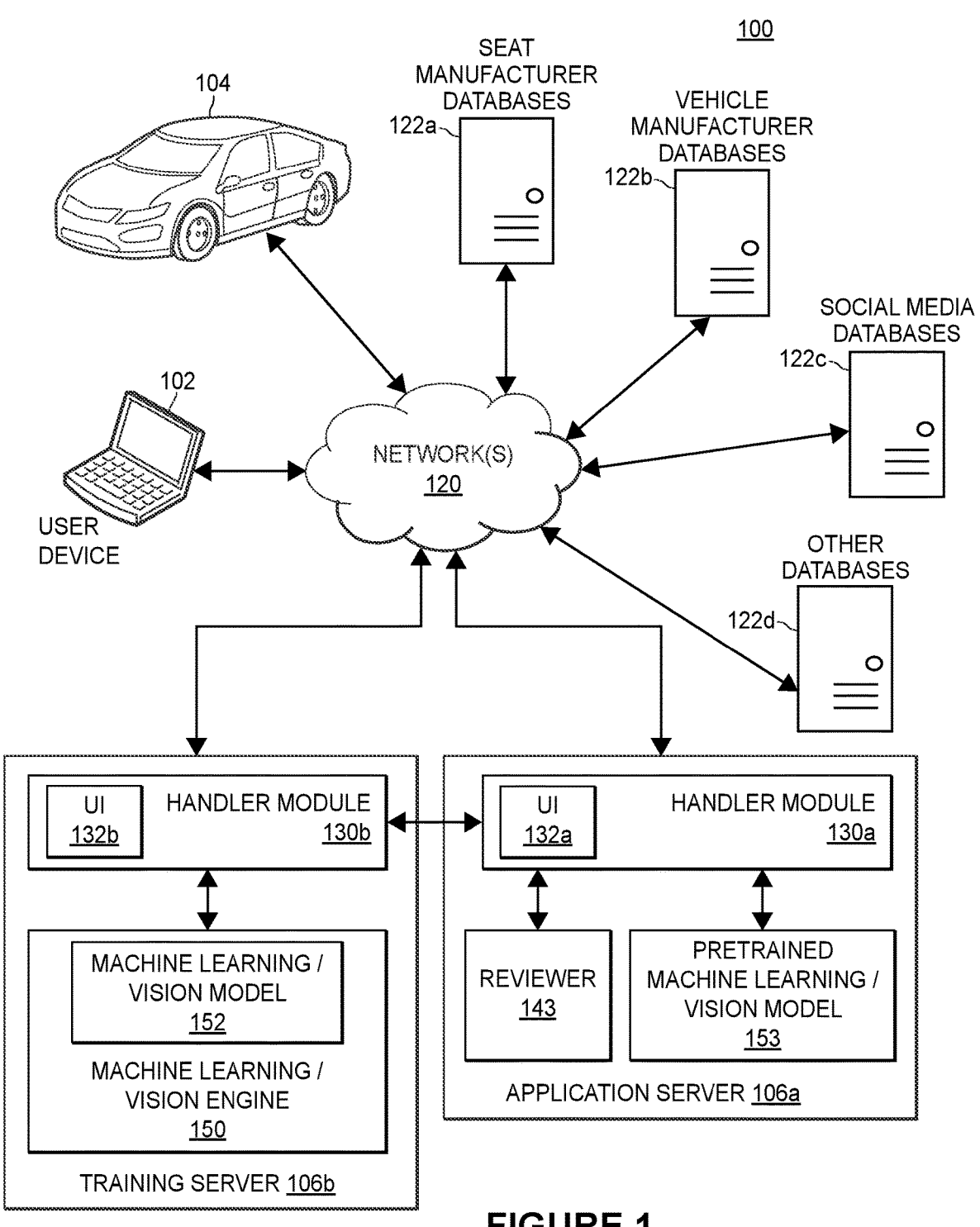
FIG. 1 depicts an exemplary computing environment for implementing the methods and systems for automated monitoring of vehicle seat installation and operation.

FIG. 1 depicts a diagram of an exemplary computing environment 100. The exemplary computing environment 100 may include a user device 102, a vehicle 104, an application server 106a, a training server 106b, one or more networks 120, one or more seat manufacturer databases 122a, one or more vehicle manufacturer databases 122b, one or more social media databased 122c, and/or one or more other database 122d.

The user device 102 may be, or may include, a computing device such as a laptop computer, a tablet, a smartphone or other smart device, a desktop device, a wearable device, mobile device, smart contacts, smart glasses, augmented reality (AR) glasses, virtual reality (VR) headset, extended or mixed reality (MR) glasses or headsets, voice bots, chat bots, ChatGPT bots, ChatGPT-based bots, etc.

The vehicle 104 may be, or may include, an internal combustion engine (ICE) vehicle, an electric vehicle (EV), a smart vehicles, etc. In some embodiments, the vehicle 104 includes a built-in computing system operatively coupled to one or more vehicle systems (e.g., a vehicle sensor system, a vehicle infotainment system, etc.). In these embodiments, the vehicle 104 may also include one or more transceivers and/or one or more network adapters for sending and receiving information over one or more communication networks (e.g., the one or more networks 120).

The one or more networks 120 may be, or may include, the internet, a local area network (LAN), a metropolitan area network (MAN), a wide area network (WAN), a wired network, a Wi-Fi network, a cellular network, a wireless network, a private network, a virtual private network, etc.

The one or more seat manufacturer databases 122a, the one or more vehicle manufacturer databases 122b, the one or more social media databased 122c, and/or the one or more other database 122d (e.g., a vehicle seat review database, etc.) may be, or may include, one or more databases, one or more servers, one or more data repositories, etc.

The application server 106a may include a handler module 130a, a reviewer 143, and/or a pretrained machine learning and/or machine vision model 153. The handler module 130a may include UI 132a. The application server 106a may be, or may include, a portion of a memory unit configured to store software and/or computer-executable instructions that, when executed by a processing unit, may cause the one or more of the above-described components to determine whether a vehicle seat has been properly installed and/or secured to the vehicle 104.

The training server 106b may include a handler module 130b and/or a machine learning and/or machine vision engine 150. The handler module 130b may include UI 132b. The machine learning and/or machine vision engine 150 may develop and/or store a machine learning and/or machine vision model 152. The training server 106b may be, or may include, a portion of a memory unit configured to store software and/or computer-executable instructions that, when executed by a processing unit, may train, validate, and/or otherwise develop the machine learning and/or machine vision model 152 for determining whether a vehicle seat has been properly installed and/or secured to the vehicle 104. In some embodiments, application server 106a and the training server 106b may be the same server.

In operation, the training server 106b may train, validate, and/or otherwise develop the machine learning and/or machine vision model 152 based upon one or more sets of training image data. The machine learning and/or machine vision model 152 may be a binary classification model, such as a CNN, a logistic regression model, a naïve Bayes model, a support vector machine (SVM) model, and/or the like. Regardless of the type of binary classification model, the binary classifications may be either "properly installed" and/or "properly secured" as a first classification and "improperly installed" and/or "improperly secured" as a second classification.

Once the training server 106b initially trains and/or initially develops the machine learning and/or machine vision model 152, the training server 106b may then validate the machine learning and/or machine vision model 152. In some embodiments, the training server 106b segments out a set of validation data may be from the corpus of training data to use when validating model performance. In these embodiments, the training data is divided into a ratio of training data and validation data (e.g., 80% training data and 20% validation data). When the machine learning and/or machine vision model 152 is satisfies a validation metric (e.g., accuracy, recall, area under curve (AUC), etc.) when applied to the validation data, the machine learning and/or machine vision model 152 may be implemented as the pretrained machine learning and/or machine vision model 153 used by the application server 106a. However, if the machine learning and/or machine vision model 152 does not satisfy the validation metrics, the training server 106b may continue training the machine vision model 152 using additional training data.

In operation, the application server 106a may establish a communicative connection with the user device 102, the vehicle 104, and/or one or more databases, servers, and/or other data repositories (e.g., the one or more seat manufacturer databases 122a, the one or more vehicle manufacturer databases 122b, the one or more social media databased 122c, and/or the one or more other database 122d, etc.) via the one or more networks 120. In some embodiments, establishing the connection may include the user of the user device 102 and/or the operator of the vehicle 104 signing into an account stored with the application server 106a. In some embodiments, establishing the connection may include navigating to a website and/or a web application hosted by the application server 106a. In these embodiments, the user device 102, as a client, may establish a client-host connection to the application server 106a, as a host. Additionally or alternatively, the user device 102 may establish the client-host connection via an application run on the user device 102. In some embodiments, the connection may be through either a third party connection (e.g., an email server) or a direct peer-to-peer (P2P) connection/transmission.

The application server 106a may route one or more sets of input data received over the one or more networks 120 to the handler module 130a. The input data may be one or more images of a vehicle seat installed in the vehicle 104. The handler module 130a may forward the one or more sets of input data to pretrained machine learning and/or machine vision model 153, which may output a determination as to whether the vehicle seat has been properly installed and/or secured to the vehicle 104. The resulting determination may be returned to the handler module 130a which may in turn present the resulting determination to the user and/or the operator via the user device 102 and/or the vehicle 104.

In some embodiments, the handler module 130a may implement an interactive UI 132 (e.g., a web-based interface, mobile application, etc.) that may be presented by the user device 102 and/or the vehicle 104. In particular, the interactive UI 132a may be configured to enable the user and/or the operator to submit image data. In some embodiments, the handler module 130a may work in conjunction with or be configured to include a chatbot to receive any input data from the user. For example, the interactive UI 132 may interface with the user to gather information relating to the vehicle 104, vehicle seats installed in the vehicle 104, and/or prompts for receiving image data.

In some additional and/or alternative embodiments, the handler module 130a may pass the resulting determination to the reviewer 143. In these embodiments, confidence values of the resulting determination did not exceed a requisite threshold value. Upon receiving the resulting determination, the input data may be manually reviewed by the reviewer 143. The reviewer 143 may evaluate whether the resulting determination was accurate and/or classify the image data. The results of the evaluation and/or the classification may be compiled and used as additional training and/or validation data when retraining the machine learning and/or machine vision model 152. In some embodiments, the reviewer 143 may be a machine learning and/or machine vision model and/or some other computer program. In some embodiments, the reviewer 143 may be an individual having skilled knowledge in the installation of vehicle seats.

It should be appreciated that while specific elements, processes, devices, and/or components are described as part of the application server 106a, other elements, processes, devices and/or components are contemplated.

Exemplary Server and Device

Figure 2A:
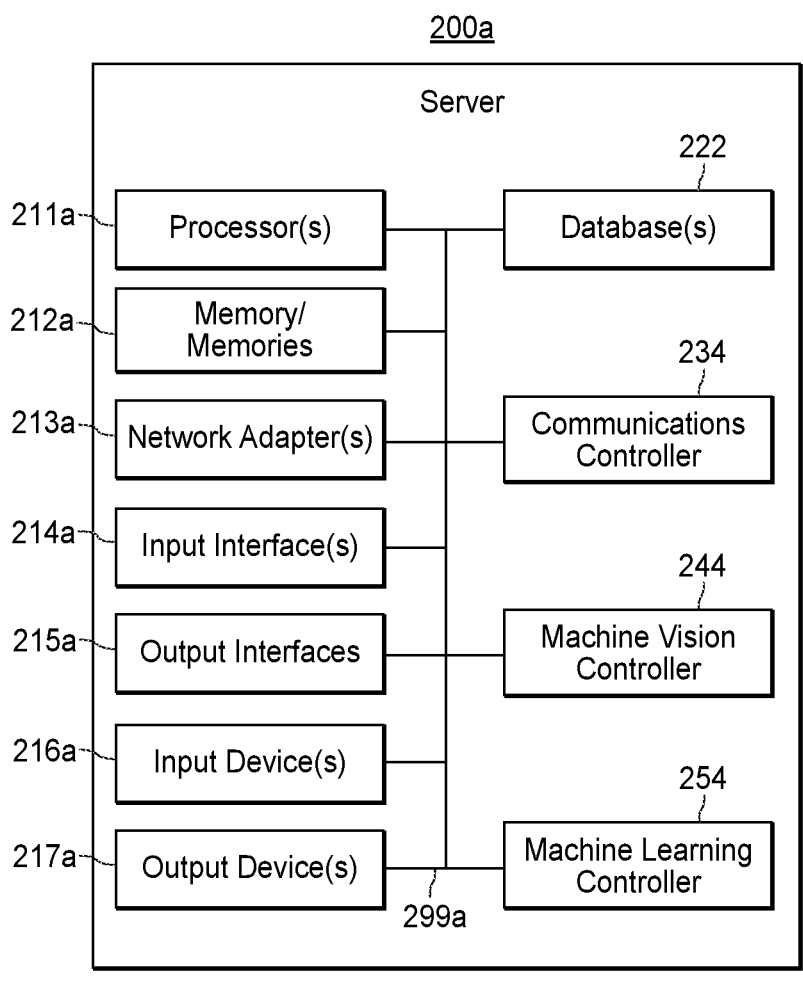
FIG. 2A depicts an exemplary server for implementing the methods and systems for automated monitoring of vehicle seat installation and operation.

FIG. 2A depicts an exemplary server 200a to monitor vehicle seat installation and/or operation. The exemplary server 200a may include one or more processors 211a, one or more memories 212a, one or more network adapters 213a, one or more input interfaces 214a, one or more output interfaces 215a, one or more input devices 216a, one or more output devices 217a, one or more databases 222, one or more communication controllers 234, one or more machine vision controllers 244, and/or one or more machine learning controllers 254. Any of the components of the exemplary server 200a may be communicatively coupled to one another via a communication bus 299a.

The one or more processors 211a may be, or may include, one or more central processing units (CPU), one or more coprocessors, one or more microprocessors, one or more graphical processing units (GPU), one or more digital signal processors (DSP), one or more application specific integrated circuits (ASIC), one or more programmable logic devices (PLD), one or more field-programmable gate arrays (FPGA), one or more field-programmable logic devices (FPLD), one or more microcontroller units (MCUs), one or more hardware accelerators, one or more special-purpose computer chips, and one or more system-on-a-chip (SoC) devices, etc.

The one or more memories 212a may be, or may include, any local short term memory (e.g., random access memory (RAM), read only memory (ROM), cache, etc.) and/or any long term memory (e.g., hard disk drives (HDD), solid state drives (SSD), etc.). The memories 212a may store computer-readable instructions configured to implement the methods described herein.

The one or more network adapters 213a may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.) configured to communicate over a communication network (e.g., the one or more networks 120).

The one or more input interfaces 214a may be, or may include, any number of different types of input units, input circuits, and/or input components that enable the one or more processors 211a to communicate with the one or more input devices 216a. Similarly, the one or more output interfaces 215a may be, or may include, any number of different types of input units, input circuits, and/or input components that enable the one or more processors 211a to communicate the one or more output devices 217a. In some embodiments, the one or more input interfaces 214a and the one or more output interfaces 215a may be combined into input/output (I/O) units, I/O circuits, and/or I/O components. The one or more input devices 216a may be, or may include, keyboards and/or keypads, interactive screens (e.g., touch screens), navigation devices (e.g., a mouse, a trackball, a capacitive touch pad, a joystick, etc.), microphones, buttons, communication interfaces, etc. The one or more output devices 217a may be, or may include display units (e.g., display screens, receipt printers, etc.), speakers, etc. The one or more input interfaces 214a and/or the one or more output interfaces 215a may also be, or may include one or more digital applications (e.g., local graphical user interfaces (GUIs)).

The one or more digital applications may be, or may include, web-based applications, mobile applications, and/or the like. In some embodiments, the one or more digital applications may be stored on the one or more memories 212a. In some embodiments, the one or more digital applications may establish a host-client connection between the exemplary server 200a as the host and the exemplary electronic device 200b as the client. In some embodiments, the one or more digital applications may include instantiations of AI-based programs, such as chatbots, to perform one or more aspects of the digital application (e.g., prompts to the user to receive data, handling of data with other AI or ML models, processing of data, etc.).

The one or more databases 222 may be, or may include, one or more databases, data repositories, etc. For example, the one or more databases 222 may store the training data used to train a machine learning model described herein.

The one or more communication controllers 234, the one or more machine vision controllers 244, and/or the one or more machine learning controllers 254 may be, or may include, computer-readable, executable instructions that may be stored in the one or more memories 212a and/or performed by the one or more processors 211a. The computer-readable, executable instructions of the one or more communication controllers 234, the one or more machine vision controllers 244, and/or the one or more machine learning controllers 254 may be stored on and/or performed by specifically designated hardware (e.g., micro controllers, microchips, etc.) which may have functionalities similar to the one or more memories 212a and/or the one or more processors 211a. The computer-readable, executable instructions of the one or more communication controllers 234 may be configured to send and/or receive electronic data. The computer-readable, executable instructions of the one or more machine vision controllers 244 may be configured to perform image recognition, object identification, and/or other image processing techniques. The computer-readable, executable instructions of the one or more machine learning controllers 254 may be configured to train, validate, and/or develop a machine learning and/or machine vision model (e.g., the machine learning and/or machine vision model 152). The one or more communication controllers 234, the one or more machine vision controllers 244, and/or the one or more machine learning controllers 254 may work independently and/or in conjunction with one another.

Figure 2B:
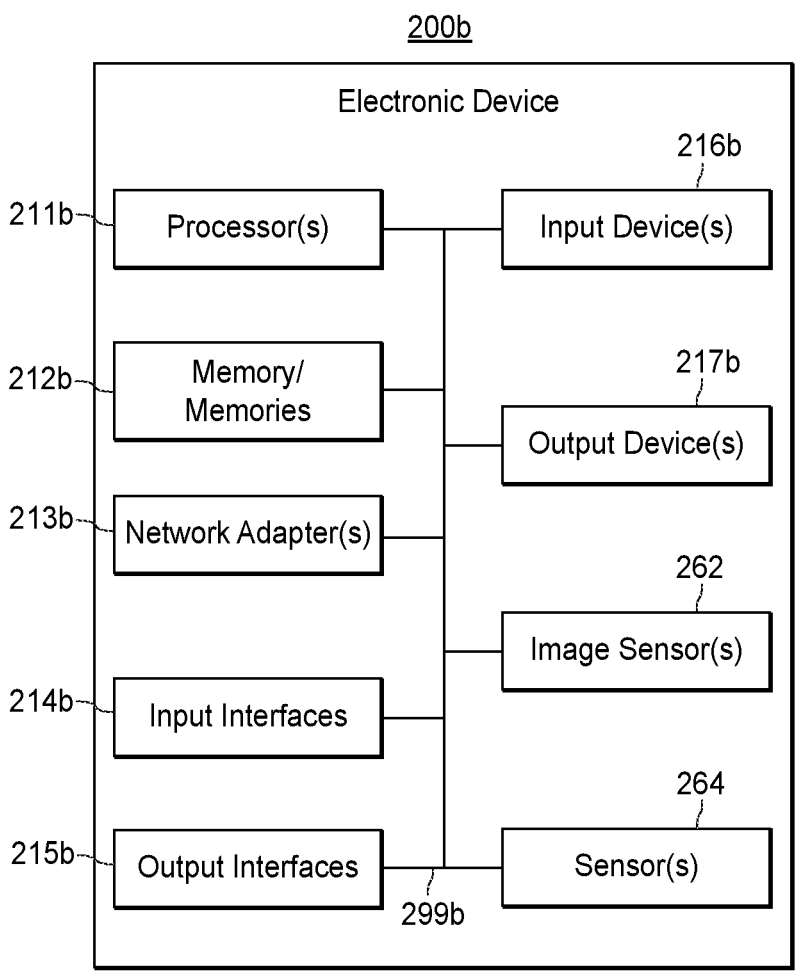
FIG. 2B depicts an exemplary device for implementing the methods and systems for automated monitoring of vehicle seat installation and operation.

FIG. 2B depicts an exemplary electronic device 200b to monitor vehicle seat installation and/or operation. The exemplary electronic device 200b may include one or more processors 211b, one or more memories 212b, one or more network adapters 213b, one or more input interfaces 214b, one or more output interfaces 215b, one or more input devices 216b, one or more output devices 217b, one or more image sensors 262, and/or one or more sensors 264. Any of the components of the exemplary electronic device 200b may be communicatively coupled to one another via a communication bus 299b.

The one or more processors 211b may be, or may include, one or more central processing units (CPU), one or more coprocessors, one or more microprocessors, one or more graphical processing units (GPU), one or more digital signal processors (DSP), one or more application specific integrated circuits (ASIC), one or more programmable logic devices (PLD), one or more field-programmable gate arrays (FPGA), one or more field-programmable logic devices (FPLD), one or more microcontroller units (MCUs), one or more hardware accelerators, one or more special-purpose computer chips, and one or more system-on-a-chip (SoC) devices, etc.

The one or more memories 212b may be, or may include, any local short term memory (e.g., random access memory (RAM), read only memory (ROM), cache, etc.) and/or any long term memory (e.g., hard disk drives (HDD), solid state drives (SSD), etc.).

The one or more network adapters 213b may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.) configured to communicate over a communication network (e.g., the one or more networks 120).

The one or more input interfaces 214b may be, or may include, any number of different types of input units, input circuits, and/or input components that enable the one or more processors 211b to communicate with the one or more input devices 216b. Similarly, the one or more output interfaces 215b may be, or may include, any number of different types of input units, input circuits, and/or input components that enable the one or more processors 211b to communicate the one or more output devices 217b. In some embodiments, the one or more input interfaces 214b and the one or more output interfaces 215b may be combined into input/output (I/O) units, I/O circuits, and/or I/O components. The one or more input devices 216b may be, or may include, keyboards and/or keypads, interactive screens (e.g., touch screens), navigation devices (e.g., a mouse, a trackball, a capacitive touch pad, a joystick, etc.), microphones, buttons, communication interfaces, etc. The one or more output devices 217b may be, or may include display units (e.g., display screens, receipt printers, etc.), speakers, etc. The one or more input interfaces 214b and/or the one or more output interfaces 215b may also be, or may include one or more digital applications (e.g., local graphical user interfaces (GUIs)).

The one or more digital applications may be, or may include, web-based applications, mobile applications, and/or the like. In some embodiments, the one or more digital applications may be stored on the one or more memories 212b. In some embodiments, the one or more digital applications may establish a host-client connection between the exemplary server 200a as the host and the exemplary electronic device 200b as the client. In some embodiments, the one or more digital applications may include instantiations of AI-based programs, such as chatbots, to perform one or more aspects of the digital application (e.g., prompts to the user to receive data, handling of data with other AI or ML models, processing of data, etc.).

The one or more image sensors 262 may be, or may include, any image capturing device, unit, and/or component capable of capturing image data. For example, the image sensors 262 may be CMOS image sensors, CCD image sensors, and/or other types of image sensor architectures. The image sensors 262 may be configured to capture convert the values of the component sensors into a file format associated with image data.

The one or more sensors 264 may be, or may include, one or more light sensors, one or more proximity sensors, one or more motion sensors, and/or one or more sensors connected to one or more apparatuses and/or systems (e.g., accelerometer sensors, throttle sensors, lane correction sensors, collision sensors, GPS sensors, gyroscopic sensors, etc.). The one or more sensors 264 may be communicatively coupled to one or more processors 211*b* and/or the one or more image sensos 262. In some embodiments, the one or more processors 211*b* may trigger the one or more image sensors 262 to capture image data in response to detecting a stimulus via the one or more sensors 264. For example, the vehicle 104 may be engaged, a door of the vehicle 104 may be opened, a collision sensor may detect an impact, a motion sensor may detect anomalous vehicle motion, etc.

Exemplary Machine Learning Training Module

Figure 3:
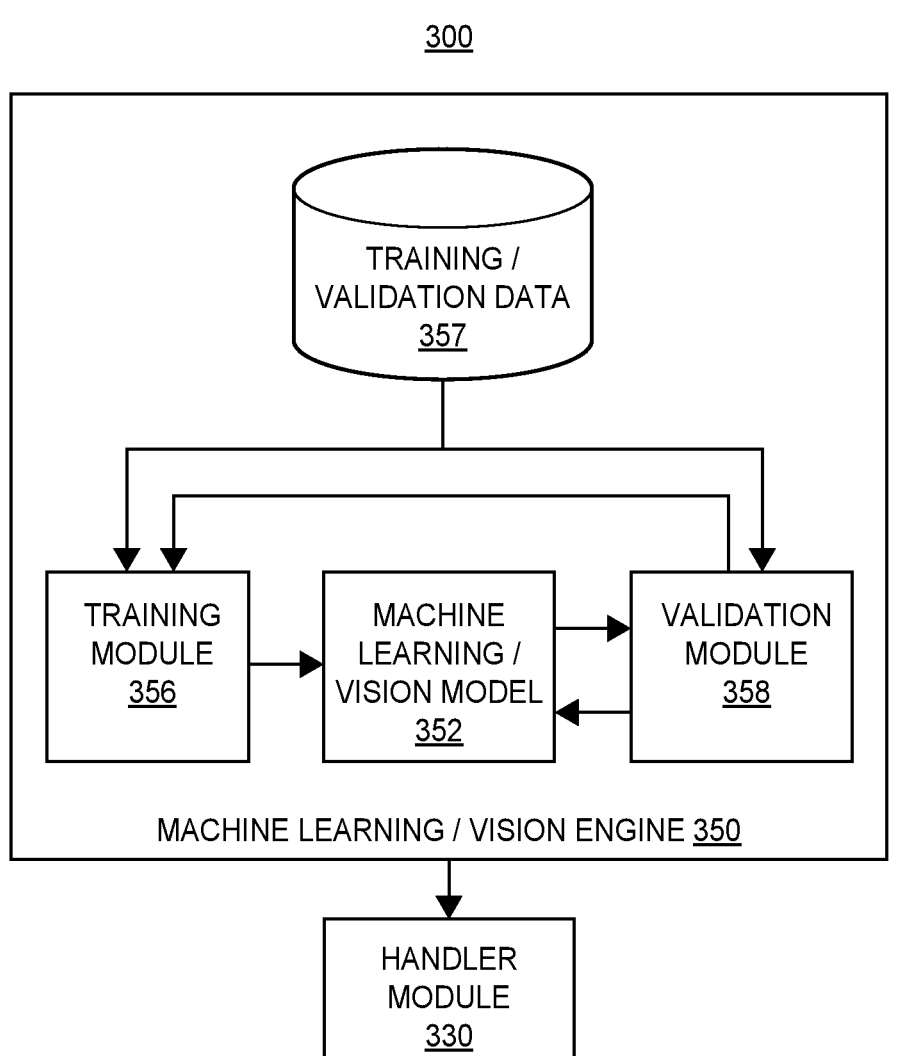
FIG. 3 depicts a diagram of an exemplary machine learning and/or machine vision training module for implementing the methods and systems for automated monitoring of vehicle seat installation and operation.

FIG. 3 depicts a diagram of an exemplary machine learning and/or machine vision training module 300. The machine learning and/or machine vision training module 300 may include a machine learning and/or machine vision engine 350 (e.g., the machine learning and/or machine vision engine 150 and/or chatbots integrated therewith). The machine learning and/or machine vision engine 350 may include training and/or validation data 357, a training module 356 and/or a validation module 358.

The machine learning and/or machine vision engine 350 may be, or may include, a portion of a memory unit (e.g., the one or more memories 212*a*) configured to store software and/or computer-executable instructions that, when executed by a processing unit (e.g., the one or more processors 211*a*), may cause the one or more of the above-described components to generate, develop, train, validate, and/or deploy a machine learning and/or machine vision model 352 (e.g., the machine learning and/or machine vision model 152) for determining whether a vehicle seat has been proper installed and/or secured to the vehicle 104. The trained machine learning and/or machine vision model 352 may be implemented as a pretrained machine learning and/or machine vision model (e.g., the pretrained machine learning and/or machine vision model 153). In some embodiments, the machine learning and/or machine vision training module 300 trains multiple machine learning and/or machine vision models 320.

The training and/or validation data 357 may include labeled image data depicting vehicle seats that are properly and improperly installed into vehicles. The machine learning and/or machine vision engine 350 may pass the training and/or validation data 357 to the training module 356 and/or the validation module 358. In some embodiments, the machine learning and/or machine vision engine 350 segments out a portion of the training data to be a validation set. For example, the machine learning and/or machine vision engine 350 may segment out 20%, 10%, 5%, etc., of the training data for the validation data set.

The training model 356 may utilize one or more machine learning and/or vision techniques to train the machine learning and/or machine vision model 352. In some embodiments, the machine learning and/or machine vision model 352 is a CNN, a FCN, or another type of neural network. Accordingly, the training process may include analyzing the labels applied to the training data to determine a plurality of weights associated with the various layers of the neural network.

The validation module 358 may validate the resulting machine learning and/or machine vision model 352 by determining a validation metric rate (e.g., accuracy, precision, recall, etc.) of the machine learning and/or machine vision model 352. If the validation metric of the machine learning and/or machine vision model 352 does not meet a predetermined threshold value, the validation module 358 may instruct the training module 356 to continue training the machine learning and/or machine vision model 352 until the machine learning and/or machine vision model 352 satisfies the validation metric.

Once the machine learning and/or machine vision model 352 satisfies the validation metric, the machine learning and/or machine vision engine 350 may pass the resulting machine learning and/or machine vision model 352 to a handler module 330 (e.g., the handler module 130*b*) of a training server (e.g., the training server 106*b*), which, in turn, may pass the machine learning and/or machine vision model 352 to another handler module 330 (e.g., the handler module 130*a*) of an application server (e.g., the application server 106*a*) to be implemented as the pretrained machine learning and/or machine vision model.

The machine learning and/or machine vision model 352 may be developed, trained, and/or validated from multiple, parallel machine learning and/or machine vision engines 350 and/or one or more chatbots. It should be appreciated that while specific elements, processes, devices, and/or components are described as part of example machine learning training module 300, other elements, processes, devices and/or components are contemplated and/or the elements, processes, devices, and/or components may interact in different ways and/or in differing orders, etc.

Exemplary Environments

Figure 4A:
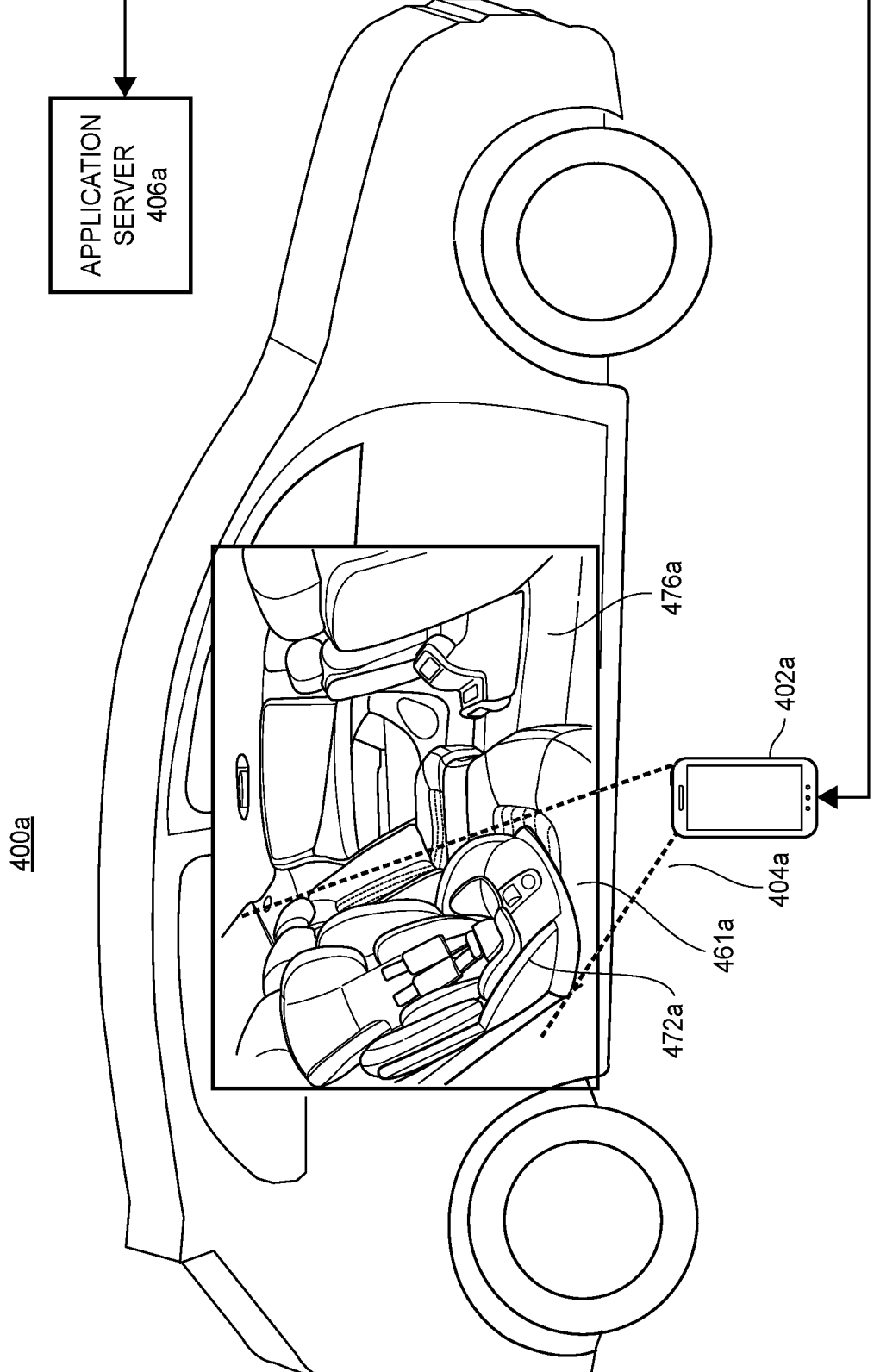
FIG. 4A depicts an exemplary environment for implementing the methods and systems for automated monitoring of vehicle seat installation.

FIG. 4A depicts an exemplary environment 400*a*. The exemplary environment 400*a* may include an electronic device 402*a* (e.g., the user device 102, a computing system of a vehicle, and/or the electronic device 200*b*), a vehicle 404*a* (e.g., the vehicle 104), and/or a vehicle seat 472*a* placed within an interior 476*a* of the vehicle 404*a*. The electronic device 402*a* may be, or may include, one or more image sensors not shown (e.g., the one or more image sensors 262) having a FOV 461*a* aligned to capture image data of the vehicle seat 472*a*. It should be appreciated that while FIG. 4A depicts the electronic device 402*a* having a smartphone form factor, in other embodiments, the electronic device 402*a* may have other form factors, including those described elsewhere herein.

In some embodiments, the vehicle seat 472*a* may be installed to the interior 476*a* of the vehicle 404*a*. An operator of the vehicle 404*a* may use the electronic device 402*a* to cause the one or more image sensors to capture image data of the vehicle seat 472*a*. In some embodiments, the user may capture image data of the vehicle seat 472*a* from one or more orientations. In some embodiments, the electronic device 402*a* may utilize an application (e.g., the one or more digital applications of the exemplary server 200*a* and/or the exemplary electronic device 200*b*) to capture the image data via the image sensors. The image data may include a set of one or more discreet digital image files. In some embodiments, the electronic device 402*a* is operated in a burst image and/or video capture mode to cause the one or more image sensors to capture the set of image data.

The electronic device 402*a* may transmit the image data to an application server 406*a* (e.g., the application server 106*a* and/or the exemplary server 200*a*), as illustrated in FIG. 1. In some embodiments, the image data is previously stored on the electronic device 402*a*. Additionally or alternatively, in some embodiments, the image data may be transmitted to the application server 406*a* upon the capture of the image data. Additionally or alternatively, in some embodiments, the image data may be captured and/or transmitted to the application server 406*a* in response to one or more prompts input into a chatbot.

The application server 406*a* may process the received image data. In some embodiments, the application server 406a may utilize a quality metric, such as the focus measure operators described above, to determine the image's quality. If the quality metric does not satisfy a threshold value, the application server 406a may instruct the electronic device 402a to capture additional image data until the application server 406a obtains image data that satisfies the quality threshold. Additionally or alternatively, in some embodiments, the application server 406a may perform image recognition, object identification, and/or other image processing techniques as described above to determine whether the vehicle seat 472a is within the image data. If the vehicle seat 472a is not recognized and/or identified in the image data, the application server 406a may instruct the electronic device 402a to capture additional image data until the application server 406a obtains image data in which a vehicle seat (e.g., vehicle seat 472a) is detected. The application server 406a may also utilize the above-described image recognition, object identification, and/or other image processing techniques to recognize and/or identify the interior 476a of the vehicle 404a as well as any connecting points between the vehicle seat 472a and the interior 476a of the vehicle 404a.

Alternatively, the application server 406a may instruct the electronic device 402a to alert the operator of the vehicle 404a that the vehicle seat 472a was not detected in the image data. In these examples, the application server 406a may analyze the image data to identify if there is an error preventing the detection of the vehicle seat 472a. For example, the application server 406a may analyze the image data to detect one or more of an error of the position of the one or more image sensors and/or an obstruction of the FOV 461a. Accordingly, the application server 406a may include a description of the error in the alert.

If a vehicle seat 472a is detected, the application server 406a may further analyze the image data to determine whether the vehicle seat 472a has been properly installed to the interior 476a of the vehicle 404a by using any of the above-described machine learning and/or machine vision techniques. In some embodiments, the application server 406a may obtain supplemental input data from the user (e.g., the make and/or model of the vehicle 404a) to identify a particular machine learning and/or machine vision model (e.g., the machine learning and/or machine vision model 152 and/or the machine learning and/or machine vision model 352) associated with the input data. In some embodiments, the application server 406a may obtain the supplemental input data from the user in response to prompts from one or more chatbots. In some embodiments, the machine learning and/or machine vision model may produce a confidence value associated with an output determination.

If the confidence value is below a threshold value, the application server 406a may present the image data to a reviewer (e.g., the reviewer 143) to determine the properness of the installation. If the evaluation of the reviewer contradicts the determination made by the application server 406a (e.g., the application server 406a determines that the vehicle seat is properly installed but the reviewer determines that the vehicle seat is not properly installed), the evaluation of the reviewer may override the determination made by the application server 406a. Additionally or alternatively, the determination of the image data, the determination made by the application server 406a, and the evaluation of the reviewer may be used to further train and/or retrain the machine learning and/or machine vision model.

The determination of the application server 406a and/or the evaluation of the reviewer may be presented to the user via the electronic device 402a. If the determination and/or the evaluation determined that the vehicle seat 472a was improperly installed, the application server 406a may further analyze the image data to determine the most likely error during installation (e.g., by analyzing the classifications output by the machine learning and/or machine vision model). Additionally or alternatively, the application server 406a may present information on how to correct the determined error to the user via the electronic device 402a. Additionally or alternatively, in some embodiments, the machine learning model may output a ranked list of potential errors, and the application server 406a may then present at least a portion of the ranked list and corresponding corrections to the user via the electronic device 402a. In some embodiments, the application server 406a may present general guidelines and/or advice for installing the vehicle seat 472a in the interior 476a of the vehicle 404a.

Figure 4B:
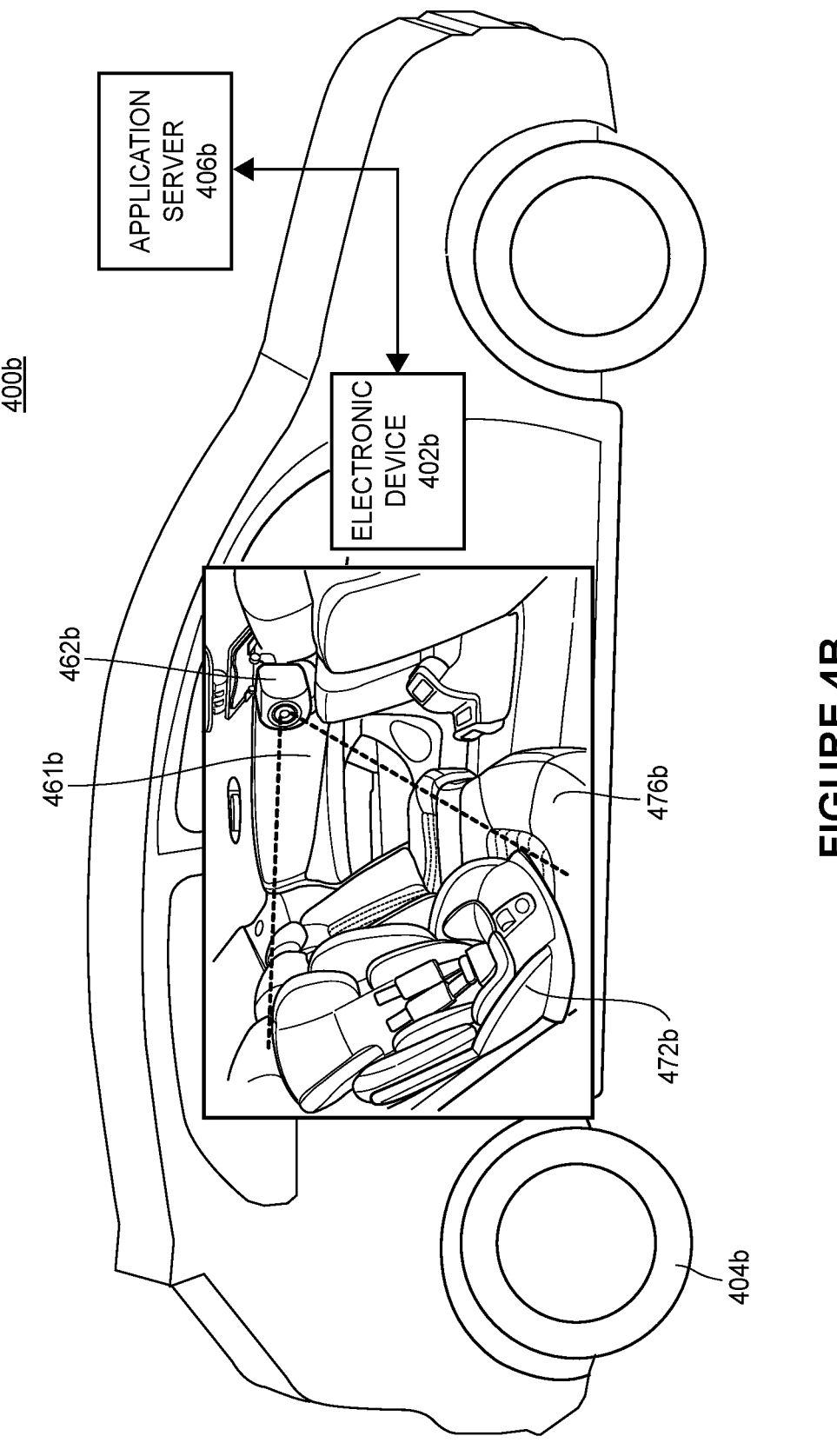
FIG. 4B depicts an exemplary environment for implementing the methods and systems for automated monitoring of vehicle seat operation.

FIG. 4B depicts an exemplary environment 400b. The exemplary environment 400b may include an electronic device 402b (e.g., the user device 102, a computing system of a vehicle, and/or the electronic device 200b), a vehicle 404b (e.g., the vehicle 104), one or more image sensors 462b (e.g., the one or more image sensors 262) having a FOV 461b to capture image data, and/or a vehicle seat 472b placed within an interior 476b of the vehicle 404b. The electronic device 402b may communicate with the one or more image sensors 462b to capture image data. In some embodiments, the image sensors 462b are included in an electronic device (such as the electronic device 402a). In other embodiments, the image sensors 462b are included in a standalone imaging device (e.g., a dashcam, a video camera affixed to the vehicle 404b).

In some embodiments, the vehicle seat 472b may be installed to the interior 476b of the vehicle 404b. In some embodiments, the electronic device 402b may cause the one or more image sensors 462b to capture image data of the vehicle seat 472b. In some embodiments, the electronic device 402b may capture image data of the vehicle seat 472b from one or more orientations. In some embodiments, the electronic device 402b may utilize an application (e.g., the one or more digital applications of the exemplary server 200a and/or the exemplary electronic device 200b) to capture the image data via the image sensors 462b. The image data may include a set of one or more discreet digital image files. In some embodiments, the electronic device 402b is operated in a burst image and/or video capture mode to cause the one or more image sensors 462b to capture the set of image data.

In some embodiments, the one or more image sensors 462b may capture a frame of image data in response to a stimulus (e.g., unlocking the vehicle 404b, opening a door of the vehicle 404b, engaging the vehicle 404b, anomalous motion of the vehicle 404b, a collision sensor, etc.). Additionally or alternatively, the one or more image sensors 462b may capture image data after a predetermined amount of time after a prior frame of image data was captured.

The electronic device 402b may transmit the image data to the application server 406b (e.g., the application server 106a and/or the exemplary server 200a), as illustrated in FIG. 1. In some embodiments, the image data is previously stored on the electronic device 402b. Additionally or alternatively, in some embodiments, the image data may be transmitted to the application server 406b upon the capture of the image data. Additionally or alternatively, in some embodiments, the image data may be captured and/or transmitted to the application server 406a in response to one or more inputs into a chatbot.

The application server 406b may process the received image data. In some embodiments, the application server 406b may utilize a quality metric, such as the focus measure operators described above, to determine the image's quality. If the quality metric does not satisfy a threshold value, the application server 406b may instruct the electronic device 402b to capture additional image data until the application server 406b obtains image data that satisfies the quality threshold. Additionally or alternatively, in some embodiments, the application server 406b may perform image recognition, object identification, and/or other image processing techniques as described above to determine whether a vehicle seat 472b is within of the image data and then track the vehicle seat 472b across one or more images. If the vehicle seat 472b is not recognized and/or identified in the image data, the application server 406b may instruct the electronic device 402b to capture additional image data until the application server 406b obtains image data in which a vehicle seat (e.g., vehicle seat 472b) is detected. If the vehicle seat is not detected, the application server 406b may instruct the electronic device 402b to alert the operator of the vehicle 404b that the vehicle seat 472b was not detected in the image data. For example, the application server 406b may analyze the image data to detect one or more of an error of the position of the one or more image sensors 462b and/or an obstruction of the FOV 461b. Accordingly, the application server 406b may include a description of the error in the alert. The application server 406b may also utilize the above-described image recognition, object identification, and/or other image processing techniques to recognize and/or identify the interior 476b of the vehicle 404b as well as any connecting points between the vehicle seat 472b and the interior 476b of the vehicle 404b.

The application server 406b may also utilize the above-described image recognition, object identification, and/or other image processing techniques to recognize, identify, and/or track the interior 476b of the vehicle 404b, connecting points between the vehicle seat 472b and the interior 476b of the vehicle 404b, and/or other fixed points in the FOV (e.g., a light fixture of the vehicle, a door frame, etc.). For example, the application server 406b may track the fixed points to calculate the displacement of the vehicle seat 472b across the one or more images. If the displacement of the vehicle seat 472b exceeds a threshold displacement, the application server 406b may determine that the vehicle seat 472b has not been properly installed and/or secured to the vehicle seat 472b.

If a vehicle seat 472b is detected, the application server 406b may further analyze the image data to determine whether the vehicle seat 472b has been properly installed and/or secured to the interior 476b of the vehicle 404b using any of the above-described machine learning and/or machine vision techniques. In some embodiments, the application server 406b may obtain supplemental input data from the user (e.g., the make and/or model of the vehicle 404b) to identify a particular machine learning and/or machine vision model associated with the input data. In some embodiments, the application server 406a may obtain the supplemental input data from the user in response to inputs into one or more chatbots.

If the application server 406b determines that the vehicle seat 472b has been improperly installed and/or secured to the vehicle 404b, the application server 406b may instruct the electronic device 402b to alert the operator. The notification may be an auditory alert (e.g., a distinct auditory alarm signal, etc.), a visual alert (e.g., a distinct vehicle dashboard alarm, a text prompt, etc.), and/or a haptic alert (e.g., a vibrational pattern of the steering wheel, etc.).

Exemplary Image Data

Figure 4C:
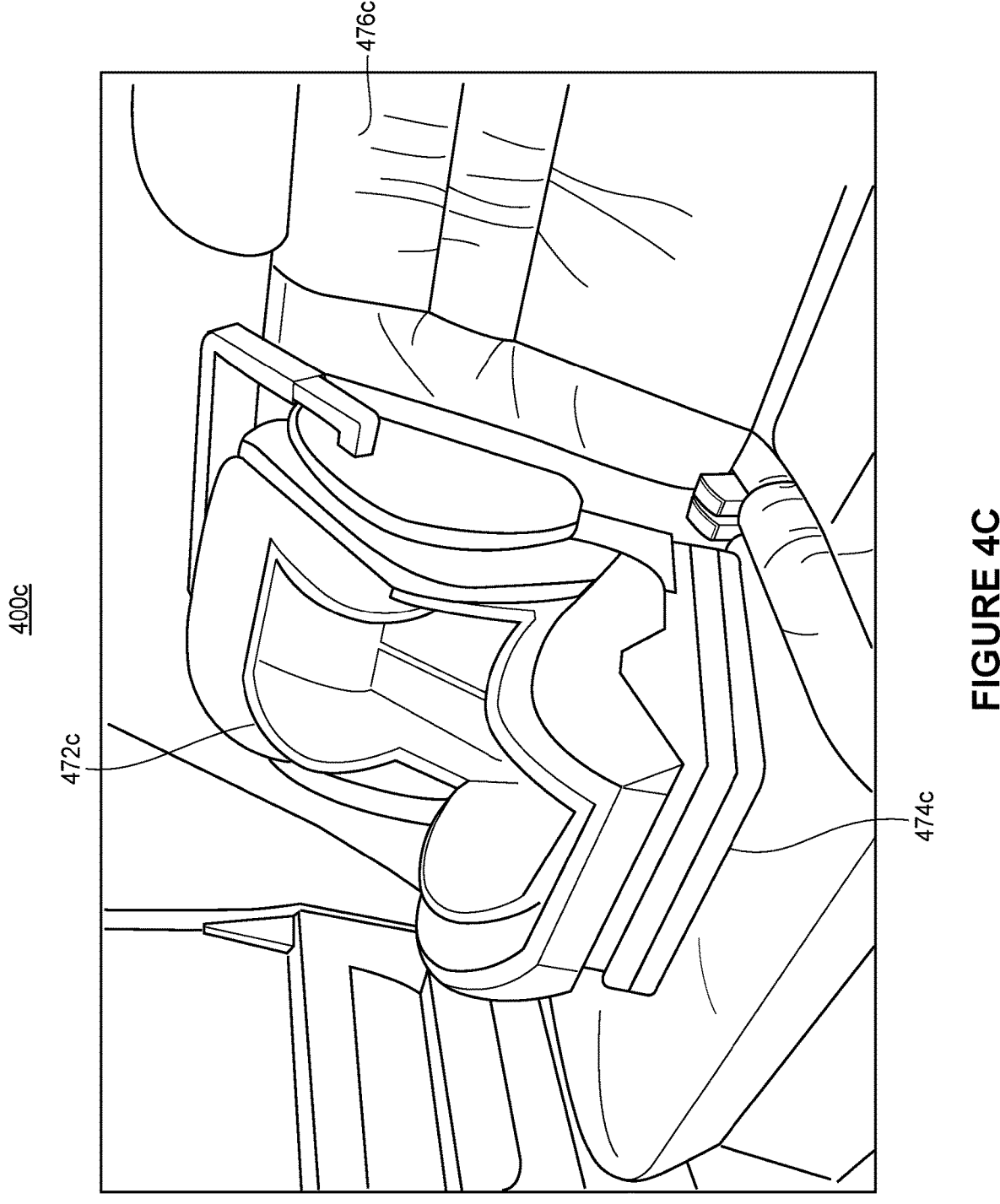
FIG. 4C depicts exemplary image data processed by a machine learning and/or machine vision system implementing the methods and systems for automated monitoring of vehicle seat installation.

FIG. 4C depicts exemplary image data 400c captured by one or more image sensors (e.g., the one or more image sensors 262 and/or the one or more image sensors 462b). In some embodiments, the exemplary image data 400c may be captured by an electronic device (e.g., the user device 102, the exemplary electronic device 200b, the electronic device 402a, and/or the electronic device 402b). The electronic device may then transmit the exemplary image data 400c to an application server (e.g., the application server 106a, the exemplary server 200a, the application server 406a, and/or the application server 406b), via one or more communication networks (e.g., the one or more networks 120). As illustrated, the exemplary image data 400c may include a vehicle seat 472c, an interior 476c of a vehicle (e.g., the vehicle 104, the vehicle 404a, and/or the vehicle 404b), and/or connecting points 474c between the vehicle seat 472c and the interior 476c of the vehicle.

In some embodiments, the application server inputs the exemplary image data 400c into a trained machine learning and/or machine vision model (e.g., the pretrained machine learning and/or the machine vision model 153) to determine the properness of the depicted installation of the vehicle seat 472c. In some embodiments, the exemplary image data 400c may include supplemental data (e.g., text-based data such as the make and/or model of the vehicle, etc.). In response, the trained machine learning and/or machine vision model may output a decision on the properness of the installation of the vehicle seat 472c.

In the illustrated scenario, the vehicle seat 472c is properly installed. Accordingly, the trained machine learning and/or machine vision model may provide an output indicating that the vehicle seat 472c is properly installed. The application server may then notify the electronic device that the vehicle seat is properly installed.

Figure 4D:
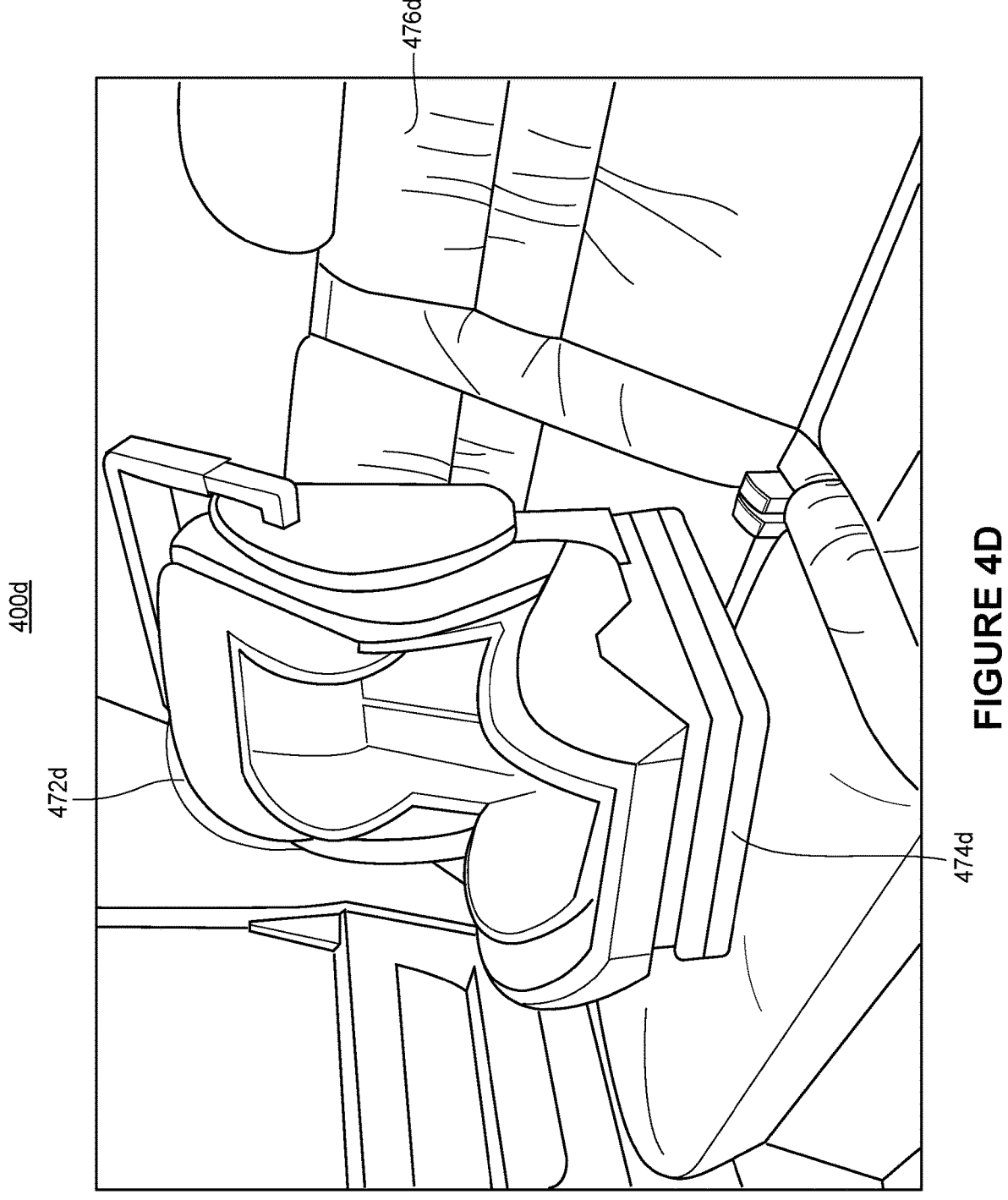
FIG. 4D depicts exemplary image data processed by a machine learning and/or machine vision system implementing the methods and systems for automated monitoring of vehicle seat installation.

FIG. 4D depicts exemplary image data 400d captured by one or more image sensors (e.g., the one or more image sensors 262 and/or the one or more image sensors 462b). In some embodiments, the exemplary image data 400d may be captured by an electronic device (e.g., a computer system of a vehicle, the exemplary electronic device 200b, the electronic device 402a, and/or the electronic device 402b). The electronic device may then transmit the exemplary image data 400d to an application server (e.g., the application server 106a, the exemplary server 200a, the application server 406a, and/or the application server 406b), via one or more communication networks (e.g., the one or more networks 120). As illustrated, the exemplary image data 400d may include a vehicle seat 472d, an interior 476d of a vehicle (e.g., the vehicle 104, the vehicle 404a, and/or the vehicle 404b), and/or connecting points 474d between the vehicle seat 472d and the interior 476d of the vehicle.

In some embodiments, the application server inputs the exemplary image data 400d into a trained machine learning and/or machine vision model (e.g., the pretrained machine learning and/or the machine vision model 153) to determine the properness of the depicted installation of the vehicle seat 472d. In some embodiments, the exemplary image data 400d may include supplemental data (e.g., text-based data such as the make and/or model of the vehicle, etc.). In response, the trained machine learning and/or machine vision model may output a decision on the properness of the installation of the vehicle seat 472d.

In the illustrated scenario, the vehicle seat 472d is improperly installed. Accordingly, the trained machine learning and/or machine vision model may provide an output indicating the vehicle seat 472*d* is improperly installed. The application server may then notify the electronic device that the vehicle seat is not properly installed.

Figure 4E:
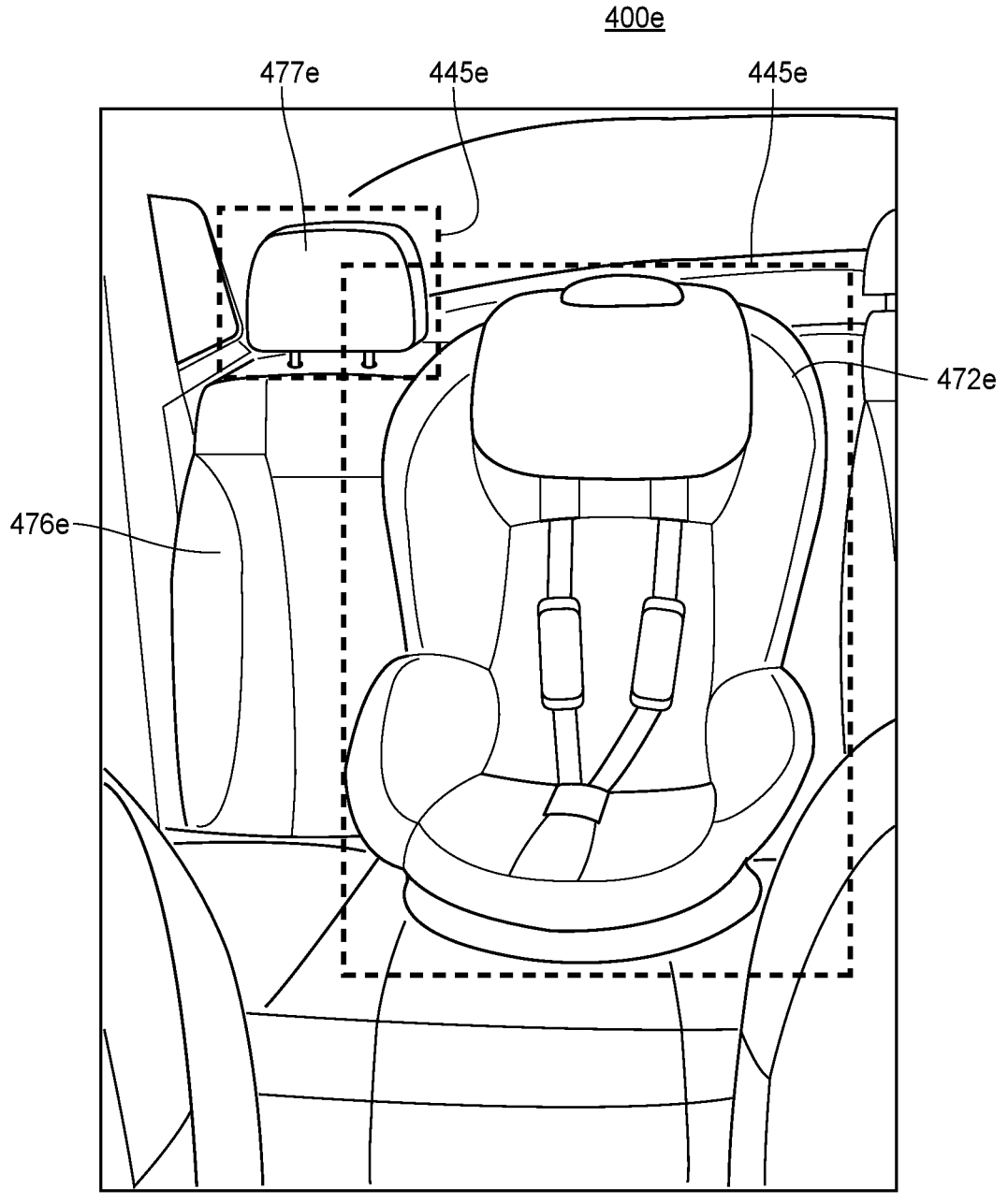
FIG. 4E depicts exemplary image data processed by a machine learning and/or machine vision system implementing the methods and systems for automated monitoring of vehicle seat operation.

FIG. 4E depicts exemplary image data 400*e* captured by one or more image sensors (e.g., the one or more image sensors 262 and/or the one or more image sensors 462*b*). In some embodiments, the exemplary image data 400*e* may be captured via the instructions of electronic device (e.g., the user device 102, the exemplary electronic device 200*b*, the electronic device 402*a*, and/or the electronic device 402*b*). The electronic device may then transmit the exemplary image data 400*e* to the application server, (e.g., the application server 106*a*, the exemplary server 200*a*, the application server 406*a*, and/or the application server 406*b*), via one or more communication networks (e.g., the one or more networks 120). As illustrated, the exemplary image data 400*e* may include a vehicle seat 472*e* and/or an interior 476*e* of a vehicle (e.g., the vehicle 104, the vehicle 404*a*, and/or the vehicle 404*b*). In some embodiments, the exemplary image data 400*e* may include supplemental data (e.g., text-based data such as the make and/or model of the vehicle, etc.).

As described herein, a trained machine learning and/or machine vision model (e.g., the pretrained machine learning and/or machine vision model 153) may also detect one or more fixed reference points 477*e* within the interior 476*e* used to measure displacement of the vehicle seat 472*e*. In the illustrated scenario, the fixed reference point 477*e* is a seat headrest. In other embodiments, other fixed reference point 477*e* may be utilized (e.g., a seat belt structure, an arm rest, a doorknob, or any other structure of the vehicle that is generally fixed in placed.

The application server may track the position of the vehicle seat 472*e* and/or the fixed reference point 477*e* to ensure that the vehicle seat 472*e* remains properly installed as the vehicle is operated. In the illustrated scenario, the application server associates the vehicle seat 472*e* and the fixed reference point 477*e* with respective boundary boxes 445*e*. In this scenario, the application server may determine a distance between the centroids of the boundary boxes 445*e* and generate an alert if the distance exceeds a predetermined threshold. In other embodiments, the trained machine learning and/or machine vision model may determine a centroid of the vehicle seat 472*e* and/or the fixed reference point 477*e* using image analysis techniques that do not rely on boundary boxes. In some further embodiments, only a particular feature of vehicle seat 472*e* (e.g., an edge, a headrest, a buckle, a base portion, etc.) is tracked by the trained machine learning and/or machine vision model.

In the illustrated scenario, the vehicle seat 472*e* is still properly installed in the vehicle. Accordingly, no alert may be generated by the application server and/or the electronic device.

Figure 4F:
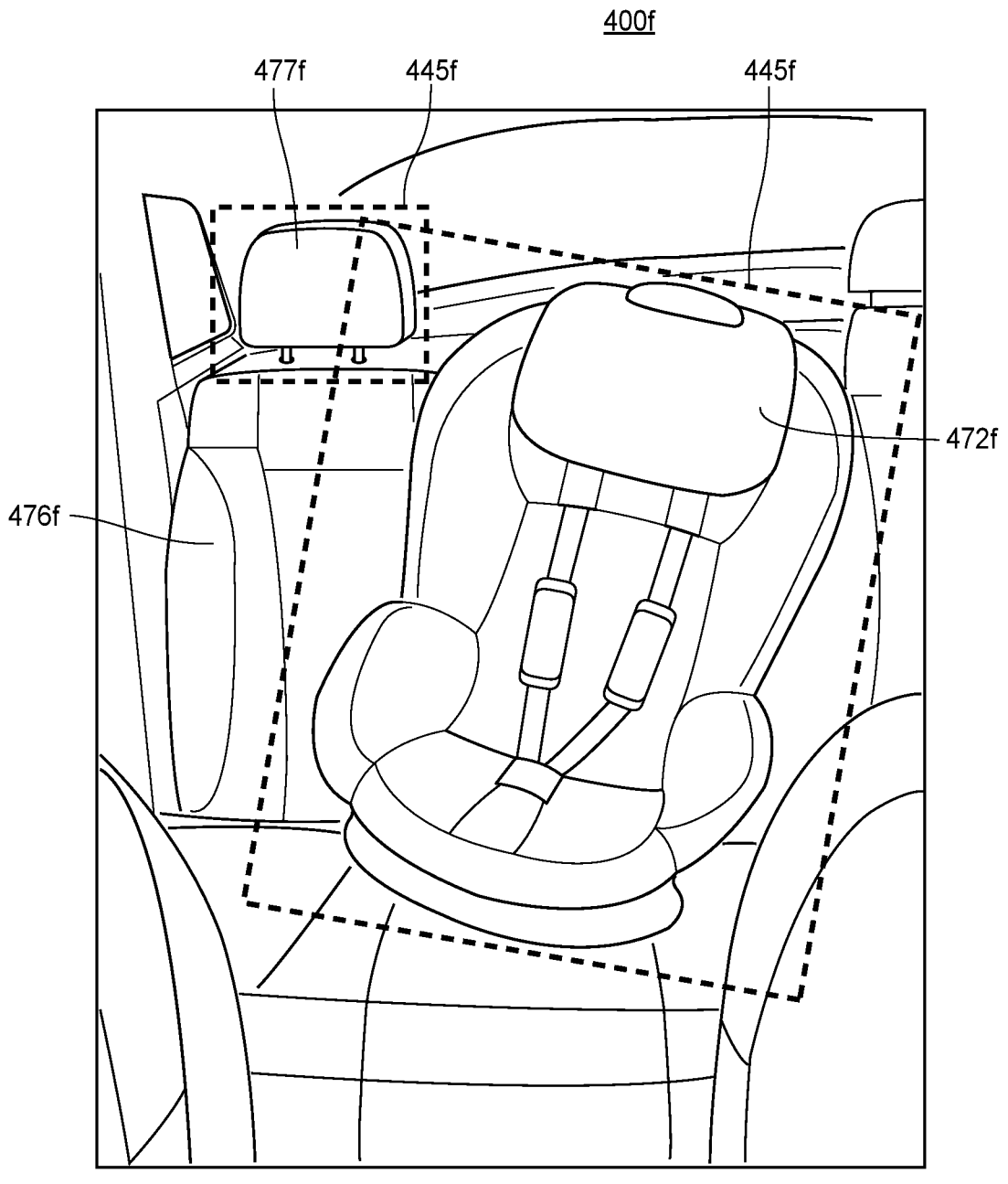
FIG. 4F depicts exemplary image data processed by a machine learning and/or machine vision system implementing the methods and systems for automated monitoring of vehicle seat operation.

FIG. 4F depicts exemplary image data 400*f* captured via the instructions of one or more image sensors (e.g., the one or more image sensors 262 and/or the one or more image sensors 462*b*). In some embodiments, the exemplary image data 400*f* may be captured via the instructions of an electronic device, not shown (e.g., the user device 102, the exemplary electronic device 200*b*, the electronic device 402*a* and/or the electronic device 402*b*). The electronic device may then transmit the exemplary image data 400*f* to the application server, not shown (e.g., the application server 106*a*, the exemplary server 200*a*, the application server 406*a* and/or the application server 406*b*), via one or more communication networks (e.g., the one or more networks 120). As illustrated, the exemplary image data 400*f* may include a vehicle seat 472*f* and/or an interior 476*f* of a vehicle (e.g., the vehicle 104, the vehicle 404*a* and/or the vehicle 404*b*). In some embodiments, the exemplary image data 400*f* may include supplemental data (e.g., text-based data such as the make and/or model of the vehicle, etc.).

As described herein, a trained machine learning and/or machine vision model (e.g., the pretrained machine learning and/or machine vision model 153) may also detect one or more fixed reference points 477*f* within the interior 476*f* used to measure displacement of the vehicle seat 47*fe*. In the illustrated scenario, the fixed reference point 477*f* is a seat headrest. In other embodiments, other fixed reference point 477*f* may be utilized (e.g., a seat belt structure, an arm rest, a doorknob, or any other structure of the vehicle that is generally fixed in placed.

The application server may track the position of the vehicle seat 472*f* and/or the fixed reference point 477*f* to ensure that the vehicle seat 472*f* remains properly installed as the vehicle is operated. In the illustrated scenario, the application server associates the vehicle seat 472*f* and the fixed reference point 477*f* with respective boundary boxes 445*f*. In this scenario, the application server may determine a distance between the centroids of the boundary boxes 445*f* and generate an alert if the distance exceeds a predetermined threshold. In other embodiments, the trained machine learning and/or machine vision model may determine a centroid of the vehicle seat 472*f* and/or the fixed reference point 477*f* using image analysis techniques that do not rely on boundary boxes. In some further embodiments, only a particular feature of vehicle seat 472*f* (e.g., an edge, a headrest, a buckle, a base portion, etc.) is tracked by the trained machine learning and/or machine vision model.

In the illustrated scenario, the vehicle seat 472*f* is not properly installed in the vehicle. Accordingly, an alert may be generated by the application server and/or the electronic device.

Exemplary Output Data

FIG. 5A depicts an exemplary user interface 500*a* for the above described methods and systems. In particular, the exemplary user interface 500*a* may be a notification 533 to a user device 502 indicating that a vehicle seat (e.g., the vehicle seat 472*a*, the vehicle seat 472*c*, and/or the vehicle seat 472*d*) has either been improperly installed to a vehicle (e.g., the vehicle 104, the vehicle 404*a*, and/or the vehicle 404*b*). As illustrated, the notification 533 may be a text-based notification.

In some embodiments, the notification 533 may be formatted to cause an application to open (e.g., a web-based application, a mobile application, etc.) when interacted with by a user. In some embodiments, the application may establish a client-host connection between the user device 502 and an application server (e.g., the application server 106*a*, the exemplary server 200*a*, the application server 406*a*, and/or the application server 406*b*).

The application may display one or more graphic user interfaces (GUIs) on a display of the user device 502. The one or more GUIs may be interactable and feature one or more interactive elements.

FIG. 5B depicts an exemplary scenario 500*b* in which a vehicle (e.g., the vehicle 104, the vehicle 404*a*, and/or the vehicle 404*b*) alerts a user to a vehicle seat (e.g., the vehicle seat 472*b*, the vehicle seat 472*e*, and/or the vehicle seat 472*f*) becoming unsecure. As illustrated, a computing system of the vehicle may be configured to provide a dashboard alert 582, a monitor notification 584, an audible alert 586 via an audio output system, and/or a haptic alert 588 via a steering wheel.

Exemplary Method of Monitoring the Installation of Vehicle Seats

FIG. 6 depicts an exemplary computer-implemented method 600 for monitoring the installation of a vehicle seat. The method 600 may employ any of the techniques, methods, and systems described herein with respect to FIGS. 1-5B.

The method 600 may begin at block 602 when a server (e.g., the application server 106a, the server 200a, the application server 406a, and/or the application server 406b) obtains, by one or more processors (e.g., the one or more processors 211a), image data of a vehicle seat (e.g., the vehicle seat 472a, the vehicle seat 472b, the vehicle seat 472c, the vehicle seat 472d, the vehicle seat 472e, and/or the vehicle seat 472f) located within a vehicle (e.g., the vehicle 104, the vehicle 404a, and/or the vehicle 404b), wherein the image data includes one or more connecting points (e.g., the connecting points 474c and/or the connecting points 474d) of the vehicle seat to the vehicle. In some embodiments, the image data may be obtained from a user device (e.g., the user device 102, the electronic device 200b, the electronic device 402a, and/or the electronic device 402b, the user device 502) via one or more communication networks (e.g., the one or more networks 120).

In some embodiments, the image data may include a plurality of images (e.g., a burst image, a set of multiple frames of a video recording, etc.). Additionally or alternatively, in some embodiments, the plurality of images may have been captured from a multiple perspectives and/or orientations.

At block 604, the server may input, by the one or more processors, the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a properness of an installation of a vehicle seat, and (c) to output a determination of a properness of an installation of a vehicle seat in response to detecting input image data.

At block 606, the server may present, by the one or more processors, an indication of the output of the machine vision model. In some embodiments, the output may be presented to the user device. Additionally or alternatively, in the cases where the output indicates that the vehicle seat has not been properly installed, the server may process the image data further by determining the most likely error made in installation. In some embodiments, the server supplements the output with text data indicating how to rectify a determined error.

Exemplary Method of Monitoring the Operation of an Installed Vehicle Seat

FIG. 7 depicts an exemplary computer-implemented method 700 for monitoring the operation of an installed vehicle seat. The method 700 may employ any of the machine learning techniques, methods, and systems described herein with respect to FIGS. 1-5B.

The method 700 may begin at block 702 when a server (e.g., the application server 106a, the server 200a, the application server 406a, and/or the application server 406b) obtains, by one or more processors (e.g., the one or more processors 211a), an initial frame of image data, wherein the first set of image data is captured via an image sensor (e.g., the one or more image sensors 262 and/or the one or more image sensors 462b) having a field of view (FOV) (e.g., the FOV 461a and/or the FOV 461b) directed at an interior location within a vehicle (e.g., the vehicle 104, the vehicle 404a, and/or the vehicle 404b).

At block 704, the server may analyze, by the one or more processors, the initial frame of image data to detect a vehicle seat (e.g., the vehicle seat 472a, the vehicle seat 472b, the vehicle seat 472c, the vehicle seat 472d, the vehicle seat 472e, and/or the vehicle seat 472f). In some embodiments, the vehicle seat may be detected using image recognition and/or objection identification techniques and/or other image processing techniques. Additionally or alternatively, the vehicle seat may be detected using machine learning techniques. In some embodiments, the system may alert the operator of the vehicle that there is no vehicle seat detected. This alert may indicate an error of the position of the image sensors, an obstruction within the FOV, an error of the system performing the method 700, or the operation of the system when no vehicle seats were installed to the vehicle.

At block 706, the server may obtain, by the one or more processors, one or more subsequent frames of image data captured via the image sensors. The one or more subsequent frames may be periodically captured after the first image frame was captured. Additionally or alternatively, the one or more subsequent frames may be captured by the image sensors after detecting a stimulus based on sensor data generated by one or more sensors (e.g., the one or more sensors 264).

At block 708, the server may track, by the one or more processors, the vehicle seat across the one or more subsequent frames of image data. In some embodiments, one or more sets of coordinates associated with the vehicle seat may be stored in memory (e.g., the one or more memories 212a).

At block 710, based upon the tracking, the server may determine, by the one or more processors, that the vehicle seat is not secured to the vehicle. In some embodiments, the determination may be based upon a relative displacement calculation of the vehicle seat. In these embodiments, a second fixed point within the FOV of the image sensors is used a reference point by which displacement is determined. Additionally or alternatively, the server may determine that the vehicle seat is not securely fastened to the vehicle if displacement across the image frames exceeds a predetermined threshold value.

At block 712, the server may generate a notification that the vehicle seat is not secured to the vehicle. In some embodiments, the notification may be an auditory alert (e.g., a distinct auditory alarm signal such as the audible alert 586), a visual alert (e.g., a distinct vehicle dashboard alarm, such as the dashboard alert 582, the notification 533, and/or the monitor notification 584), and/or a haptic alert (e.g., a distinct haptic alarm, such as the haptic alert 588).

Additional Exemplary Embodiments: Vehicle Seat Installation Monitoring System

In one aspect, a computer-implemented method for monitoring the installation of a vehicle seat may be provided. The method may be implemented via one or more local and/or remote processors, transceivers, sensors, servers, memory units, mobile devices, wearables, smart glasses, augmented reality glasses, virtual reality headsets, smart devices, smart glasses, augmented reality (AR) glasses, virtual reality (VR) headsets, extended or mixed reality glasses or headsets, voice bots, chat bots, ChatGPT bots, ChatGPT-based bot, and/or other electronic and/or electrical components, which may be in wired or wireless communication with one another. For example, in one instance, the method may include: (1) obtaining, by one or more processors, image data of a vehicle seat located within a vehicle, wherein the image data may include one or more connecting points of the vehicle seat to the vehicle; (2) inputting, by the one or more processors, the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a properness of an installation of a vehicle seat, and/or (c) to output a determination of a properness of an installation of a vehicle seat in response to detecting input image data; and/or (3) presenting, by the one or more processors, an indication of the output of the machine vision model. The method may include additional, less, or alternate actions, including those discussed elsewhere herein.

Additionally or alternatively to the above-described method, the image data may include two or more images depicting the one or more connecting points from different orientations; the image data may be captured by an image sensor communicatively coupled to the vehicle; and/or the image data may be captured by a mobile device of an individual associated with the vehicle.

Additionally or alternatively to the above-described method, in some embodiments, the output of the machine vision model may include a confidence in a labeling decision. In these embodiments, the method may further include determining, via the one or more processors, that the confidence in the labeling decision is below a threshold value; presenting, via the one or more processors, the image data to a reviewer to obtain a review decision of whether the vehicle seat is properly installed within the vehicle; comparing, by the one or more processors, the review decision to the labeling decision of the machine vision model; and/or retraining, by the one or more processors, the machine vision model based at least in part upon the comparison.

Additionally or alternatively to the above-described method, in some embodiments, the machine vision model may include an object identification model trained to identify a presence of a vehicle seat in the input image data and/or the output of the machine vision model may include an indication that no vehicle seat was detected when the object identification model does not detect the presence of a vehicle seat in the input image data. In these embodiments, the object identification model may be trained to identify a model of the vehicle seat detected in the input image data and/or the output of the machine vision model may include an indication of the vehicle model. Additionally or alternatively, the method may further include obtaining, by the one or more processors, installation instructions associated with the model of the vehicle seat and/or presenting, by the one or more processors, at least a portion of the installation instructions.

In another aspect, a computer system for monitoring the installation of a vehicle seat may be provided. The computer system may be configured to include one or more local and/or remote processors, transceivers, sensors, servers, memory units, mobile devices, wearables, smart glasses, augmented reality glasses, virtual reality headsets, smart devices, smart glasses, augmented reality (AR) glasses, virtual reality (VR) headsets, extended or mixed reality glasses or headsets, voice bots, chat bots, ChatGPT bots, ChatGPT-based bot, and/or other electronic and/or electrical components, which may be in wired or wireless communication with one another. For example, in one instance, the computer system may include one or more processors; and/or a non-transitory program memory coupled to the one or more processors and/or storing executable instructions that, when executed by the one or more processors, cause the computer system to: (1) obtain image data of a vehicle seat located within a vehicle, wherein the image data may include one or more connecting points of the vehicle seat to the vehicle; (2) input the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a properness of an installation of a vehicle seat, and/or (c) to output a determination of a properness of an installation of a vehicle seat in response to detecting input image data; and/or (3) present an indication of the output of the machine vision model. The computer system may be configured to include additional, less, or alternate functionality, including that discussed elsewhere herein.

Additionally or alternatively to the above-described system, the image data may include two or more images depicting the one or more connecting points from different orientations; the image data may be captured by an image sensor communicatively coupled to the vehicle; and/or the image data may be captured by a mobile device of an individual associated with the vehicle.

Additionally or alternatively to the above-described system, in some embodiments, the output of the machine vision model may include a confidence in a labeling decision. In these embodiments, the system may be further configured to determine that the confidence in the labeling decision is below a threshold value; present the image data to a reviewer to obtain a review decision of whether the vehicle seat is properly installed within the vehicle; compare the review decision to the labeling decision of the machine vision model; and/or retrain the machine vision model based at least in part upon the comparison.

Additionally or alternatively to the above-described system, in some embodiments, the machine vision model may include an object identification model trained to identify a presence of a vehicle seat in the input image data and/or the output of the machine vision model may include an indication that no vehicle seat was detected when the object identification model does not detect the presence of a vehicle seat in the input image data. In these embodiments, the object identification model may be trained to identify a model of the vehicle seat detected in the input image data and/or the output of the machine vision model may include an indication of the vehicle model. Additionally or alternatively, the system may be further configured to obtain installation instructions associated with the model of the vehicle seat and/or present at least a portion of the installation instructions.

In another aspect, a tangible, a non-transitory computer-readable medium may store executable instructions for monitoring the installation of a vehicle seat may be provided. The executable instructions, when executed, may cause one or more processors to: (1) obtain image data of a vehicle seat located within a vehicle, wherein the image data includes one or more connecting points of the vehicle seat to the vehicle; (2) input the image data into a machine vision model, wherein the machine vision model is trained: (a) using historical image data of vehicle seats within vehicles, wherein the historical image data is labeled to indicate whether a depicted vehicle seat is properly installed, (b) to learn a relationship between extracted features of the historical image data and a properness of an installation of a vehicle seat, and/or (c) to output a determination of a properness of an installation of a vehicle seat in response to detecting input image data; and/or (3) present an indication of the output of the machine vision model. The executable instructions may direct additional, less, or alternate functionality, including that discussed elsewhere herein.

Additionally or alternatively to the above-described executable instructions, the image data may include two or more images depicting the one or more connecting points from different orientations; the image data may be captured by an image sensor communicatively coupled to the vehicle; and/or the image data may be captured by a mobile device of an individual associated with the vehicle.

Additionally or alternatively to the above-described executable instructions, in some embodiments, the output of the machine vision model may include a confidence in a labeling decision. In these embodiments, the executable instructions may further cause the system to determine that the confidence in the labeling decision is below a threshold value; present the image data to a reviewer to obtain a review decision of whether the vehicle seat is properly installed within the vehicle; compare the review decision to the labeling decision of the machine vision model; and/or retrain the machine vision model based at least in part upon the comparison.

Additionally or alternatively to the above-described executable instructions, in some embodiments, the machine vision model may include an object identification model trained to identify a presence of a vehicle seat in the input image data and/or the output of the machine vision model may include an indication that no vehicle seat was detected when the object identification model does not detect the presence of a vehicle seat in the input image data. In these embodiments, the object identification model may be trained to identify a model of the vehicle seat detected in the input image data and/or the output of the machine vision model may include an indication of the vehicle model. Additionally or alternatively, the executable instructions may further cause the system to obtain installation instructions associated with the model of the vehicle seat and/or present at least a portion of the installation instructions.

Additional Exemplary Embodiments: Vehicle Seat Operation Monitoring System

In one aspect, a computer-implemented method for monitoring the operation of an installed vehicle seat may be provided. The method may be implemented via one or more local and/or remote processors, transceivers, sensors, servers, memory units, mobile devices, wearables, smart glasses, augmented reality glasses, virtual reality headsets, smart devices, smart glasses, augmented reality (AR) glasses, virtual reality (VR) headsets, extended or mixed reality glasses or headsets, voice bots, chat bots, ChatGPT bots, ChatGPT-based bot, and/or other electronic and/or electrical components, which may be in wired or wireless communication with one another. For example, in one instance, the method may include: (1) obtaining, by one or more processors, an initial frame of image data, wherein the first set of image data may be captured via an image sensor having a field of view (FOV) directed at an interior location within a vehicle; (2) analyzing, by the one or more processors, the initial frame of image data to detect a vehicle seat; (3) obtaining, by the one or more processors, one or more subsequent frames of image data that may be captured via the image sensors; (4) tracking, by the one or more processors, the vehicle seat across the one or more subsequent frames of image data; (5) based upon the tracking, determining, by the one or more processors, that the vehicle seat is not secured to the vehicle; and/or (6) presenting, by the one or more processors, a notification that the vehicle seat is not secured to the vehicle. The method may include additional, less, or alternate actions, including those discussed elsewhere herein.

Additionally or alternatively to the above-described method, the one or more subsequent frames of image data may be periodically obtained; the notification may include one or more of (i) an auditory alert, (2) a visual alert, or (3) a haptic alert; and/or the image sensor may be communicatively coupled to the vehicle. Additionally or alternatively, in some embodiments, the method may further include confirming, by the one or more processors, the determination that vehicle is not secured to the vehicle by inputting a subsequent frame of image data into a machine vision model.

Additionally or alternatively to the above-described method, in some embodiments, the method may further include analyzing, by the one or more processors, the initial frame of image data to identify one or more reference objects; and/or tracking, by the one or more processors, the one or more reference objects across the one or more subsequent frames of image data. Additionally or alternatively, determining that vehicle seat is not secured to the vehicle may include determining, via the one or more processors, that a relative position between the vehicle seat and the one or more reference objects exceeds a threshold.

Additionally or alternatively to the above-described method, in some embodiments, obtaining a particular frame of the one or more subsequent frames of image data may include detecting, by the one or more processors, a stimulus associated with the vehicle and/or causing, by the one or more processors, the image sensor to capture the particular frame of image data. Additionally or alternatively, detecting the stimulus may include obtaining, by the one or more processors, sensor data generated by one or more sensors of the vehicle and/or analyzing, by the one or more processors, the sensor data to detect the stimulus. In some embodiments, the stimulus may be indicative of abnormal motion of the vehicle.

In another aspect, a computer system for monitoring the operation of an installed vehicle seat may be provided. The computer system may be configured to include one or more local and/or remote processors, transceivers, sensors, servers, memory units, mobile devices, wearables, smart glasses, augmented reality glasses, virtual reality headsets, smart devices, smart glasses, augmented reality (AR) glasses, virtual reality (VR) headsets, extended or mixed reality glasses or headsets, voice bots, chat bots, ChatGPT bots, ChatGPT-based bot, and/or other electronic and/or electrical components, which may be in wired or wireless communication with one another. For example, in one instance, the computer system may include one or more processors; and/or a non-transitory program memory coupled to the one or more processors and/or storing executable instructions that, when executed by the one or more processors, cause the computer system to: (1) obtain an initial frame of image data, wherein the first set of image data may be captured via an image sensor that may have a field of view (FOV) directed at an interior location within a vehicle; (2) analyze the initial frame of image data to detect a vehicle seat; (3) obtain one or more subsequent frames of image data that may be captured via the image sensors; (4) track the vehicle seat across the one or more subsequent frames of image data;

(5) based upon the tracking, determine that the vehicle seat is not secured to the vehicle; and/or (6) present a notification that the vehicle seat is not secured to the vehicle. The computer system may be configured to include additional, less, or alternate functionality, including that discussed elsewhere herein.

Additionally or alternatively to the above-described system, the one or more subsequent frames of image data may be periodically obtained; the notification may include one or more of (i) an auditory alert, (2) a visual alert, or (3) a haptic alert; and/or the image sensor may be communicatively coupled to the vehicle. Additionally or alternatively, in some embodiments, the system may be further configured to confirm the determination that vehicle is not secured to the vehicle by inputting a subsequent frame of image data into a machine vision model.

Additionally or alternatively to the above-described system, in some embodiments, the system may be further configured to analyze the initial frame of image data to identify one or more reference objects; and/or track the one or more reference objects across the one or more subsequent frames of image data. Additionally or alternatively, determining that vehicle seat is not secured to the vehicle may cause the system to determine that a relative position between the vehicle seat and the one or more reference objects exceeds a threshold.

Additionally or alternatively to the above-described system, in some embodiments, obtaining a particular frame of the one or more subsequent frames of image data may cause the system to detect a stimulus associated with the vehicle and/or cause the image sensor to capture the particular frame of image data. Additionally or alternatively, detecting the stimulus may cause the system to obtain sensor data generated by one or more sensors of the vehicle and/or analyze the sensor data to detect the stimulus. In some embodiments, the stimulus may be indicative of abnormal motion of the vehicle.

In another aspect, a tangible, a non-transitory computer-readable medium may store executable instructions for monitoring the operation of an installed vehicle seat may be provided. The executable instructions, when executed, may cause one or more processors to: (1) obtain an initial frame of image data, wherein the first set of image data may be captured via an image sensor that may have a field of view (FOV) directed at an interior location within a vehicle; (2) analyze the initial frame of image data to detect a vehicle seat; (3) obtain one or more subsequent frames of image data captured via the image sensors; (4) track the vehicle seat across the one or more subsequent frames of image data; (5) based upon the tracking, determine that the vehicle seat is not secured to the vehicle; and/or (6) present a notification that the vehicle seat is not secured to the vehicle. The executable instructions may direct additional, less, or alternate functionality, including that discussed elsewhere herein.

Additionally or alternatively to the above-described executable instruction, the one or more subsequent frames of image data may be periodically obtained; the notification may include one or more of (i) an auditory alert, (2) a visual alert, or (3) a haptic alert; and/or the image sensor may be communicatively coupled to the vehicle. Additionally or alternatively, in some embodiments, the executable instructions may further cause the system to confirm the determination that vehicle is not secured to the vehicle by inputting a subsequent frame of image data into a machine vision model.

Additionally or alternatively to the above-described executable instructions, in some embodiments, the executable instructions may further cause the system to analyze the initial frame of image data to identify one or more reference objects; and/or track the one or more reference objects across the one or more subsequent frames of image data. Additionally, determining that vehicle seat is not secured to the vehicle may cause the system to determine that a relative position between the vehicle seat and the one or more reference objects exceeds a threshold.

Additionally or alternatively to the above-described executable instructions, in some embodiments, obtaining a particular frame of the one or more subsequent frames of image data may cause the system to detect a stimulus associated with the vehicle and/or cause the image sensor to capture the particular frame of image data. Additionally or alternatively, detecting the stimulus may cause the system to obtain sensor data generated by one or more sensors of the vehicle and/or analyze the sensor data to detect the stimulus. In some embodiments, the stimulus may be indicative of abnormal motion of the vehicle.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the above-described detailed description be regarded as illustrative rather than limiting, and that it be understood that it is the following claims, including all equivalents, that are intended to define the spirit and scope of this invention.

What is claimed:

1. A computer-implemented method for automated machine vision monitoring of vehicle seats, the computer-implemented method comprising:

obtaining, by one or more processors, an initial frame of image data, wherein the initial frame of image data is captured via an image sensor having a field of view (FOV) directed at an interior location within a vehicle;

analyzing, by the one or more processors, the initial frame of image data to detect a safety seat configured to be installed in the vehicle;

obtaining, by the one or more processors, one or more subsequent frames of image data captured via the image sensor;

tracking, by the one or more processors, the safety seat across the one or more subsequent frames of image data;

based upon the tracking, determining, by the one or more processors, that the safety seat is not installed in the vehicle; and presenting, by the one or more processors, a notification that the safety seat is not installed in the vehicle.

2. The computer-implemented method of claim 1, further comprising:

analyzing, by the one or more processors, the initial frame of image data to identify one or more reference objects; and tracking, by the one or more processors, the one or more reference objects across the one or more subsequent frames of image data.

3. The computer-implemented method of claim 2, wherein determining that the safety seat is not installed in the vehicle comprises:

determining, via the one or more processors, that a relative position between the safety seat and the one or more reference objects exceeds a threshold.

4. The computer-implemented method of claim 1, wherein obtaining a particular frame of the one or more subsequent frames of image data comprises:

detecting, by the one or more processors, a stimulus associated with the vehicle; and causing, by the one or more processors, the image sensor to capture the particular frame of image data.

5. The computer-implemented method of claim 4, wherein detecting the stimulus comprises:

obtaining, by the one or more processors, sensor data generated by one or more sensors of the vehicle; and analyzing, by the one or more processors, the sensor data to detect the stimulus.

6. The computer-implemented method of claim 4, wherein the stimulus is indicative of abnormal motion of the vehicle.

7. The computer-implemented method of claim 1, wherein the one or more subsequent frames of image data are periodically obtained.

8. The computer-implemented method of claim 1, wherein the notification includes one or more of (i) an auditory alert, (2) a visual alert, or (3) a haptic alert.

9. The computer-implemented method of claim 1, wherein the image sensor is communicatively coupled to the vehicle.

10. The computer-implemented method of claim 1, further comprising:

confirming, by the one or more processors, that the safety seat is not installed in the vehicle by inputting a subsequent frame of image data into a machine vision model.

11. A computer system for automated machine vision monitoring of vehicle seats, the computer system comprising:

one or more processors; and a non-transitory program memory coupled to the one or more processors and storing executable instructions that, when executed by the one or more processors, cause the computer system to:

obtain an initial frame of image data, wherein the initial frame of image data is captured via an image sensor having a field of view (FOV) directed at an interior location within a vehicle;

analyze the initial frame of image data to detect a safety seat configured to be installed in the vehicle;

obtain one or more subsequent frames of image data captured via the image sensor;

track the safety seat across the one or more subsequent frames of image data;

based upon the tracking, determine that the safety seat is not installed in the vehicle; and present a notification that the safety seat is not installed in the vehicle.

12. The computer system of claim 11, wherein the executable instructions, when executed by the one or more processors, further cause the computer system to:

analyze the initial frame of image data to identify one or more reference objects; and track the one or more reference objects across the one or more subsequent frames of image data.

13. The computer system of claim 12, wherein determining that the safety seat is not installed in the vehicle causes the computer system to:

determine that a relative position between the safety seat and the one or more reference objects exceeds a threshold.

14. The computer system of claim 11, wherein obtaining a particular frame of the one or more subsequent frames of image data causes the computer system to:

detect a stimulus associated with the vehicle; and cause the image sensor to capture the particular frame of image data.

15. The computer system of claim 14, wherein detecting the stimulus causes the computer system to:

obtain sensor data generated by one or more sensors of the vehicle; and analyze the sensor data to detect the stimulus.

16. The computer system of claim 14, wherein the stimulus is indicative of abnormal motion of the vehicle.

17. The computer system of claim 11, wherein the one or more subsequent frames of image data are periodically obtained.

18. The computer system of claim 11, wherein the notification includes one or more of (i) an auditory alert, (2) a visual alert, or (3) a haptic alert.

19. The computer system of claim 11, wherein the image sensor is communicatively coupled to the vehicle.

20. A tangible, non-transitory computer-readable medium storing executable instructions for automated machine vision monitoring of vehicle seats, wherein the executable instructions, when executed by one or more processors of a computer system, cause the computer system to:

obtain an initial frame of image data, wherein the initial frame of image data is captured via an image sensor having a field of view (FOV) directed at an interior location within a vehicle;

analyze the initial frame of image data to detect a safety seat configured to be installed in the vehicle;

obtain one or more subsequent frames of image data captured via the image sensor;

track the safety seat across the one or more subsequent frames of image data;

based upon the tracking, determine that the safety seat is not installed in the vehicle; and present a notification that the safety seat is not installed in the vehicle.

* * * * *